(12) United States Patent
Honda

(10) Patent No.: US 7,702,860 B2
(45) Date of Patent: Apr. 20, 2010

(54) MEMORY ACCESS APPARATUS

(75) Inventor: Iwao Honda, Gunma (JP)

(73) Assignees: Sanyo Electric Co., Ltd., Osaka (JP); Sanyo Semiconductor Co., Ltd., Gunma (JP)

(*) Notice: Subject to any disclaimer, the term of this patent is extended or adjusted under 35 U.S.C. 154(b) by 477 days.

(21) Appl. No.: 11/832,536

(22) Filed: Aug. 1, 2007

(65) Prior Publication Data

US 2008/0077754 A1    Mar. 27, 2008

(51) Int. Cl.
G06F 12/00 (2006.01)
G06F 13/14 (2006.01)

(52) U.S. Cl. .................. 711/150; 711/157; 711/167; 711/168

(58) Field of Classification Search .................. None
See application file for complete search history.

(56) References Cited

U.S. PATENT DOCUMENTS 5,717,394 A * 2/1998 Schwartz et al. .............. 341/51
5,909,588 A * 6/1999 Fujimura et al. .............. 712/23
6,587,913 B2 * 7/2003 Campanale et al. ............ 711/5

FOREIGN PATENT DOCUMENTS

JP       10-143448      5/1998
JP       2006-190389    7/2006

OTHER PUBLICATIONS

Office Action from counterpart Korean Patent Application No 10-2007-95856, dated Mar. 30, 2009, with English translation (5 pages).

* cited by examiner

*Primary Examiner*—Than Nguyen
(74) *Attorney, Agent, or Firm*—Fish & Richardson P.C.

(57) ABSTRACT

A memory access apparatus for accessing a first memory and a second memory, includes: an address outputting unit configured to output a read address to at least one of the first and the second memories; an access request outputting unit configured to output a read request to at least one of the first and the second memories; a data information outputting unit configured to output an information on the data size, and an information on the address, of the read data; and a read data outputting unit configured to generate the read data to be output, from the data output from at least one of the first and the second memories in response to the read address and the read request.

8 Claims, 23 Drawing Sheets

| | T1 | T2 | T3 | T4 | T5 | T6 |
|---|---|---|---|---|---|---|
| FETCH (F) | FETCH A | FETCH B | FETCH C | FETCH D | FETCH E | FETCH F |
| DECODE (D) | | DECODE A | DECODE B | DECODE C | DECODE D | DECODE E |
| ADDRESS GENERATION (A) | | | ADDRESS A | ADDRESS B | ADDRESS C | ADDRESS D |
| EXECUTION (E1) | | | | EXECUTION A1 | EXECUTION B1 | EXECUTION C1 |
| EXECUTION (E2) | | | | | EXECUTION A2 | EXECUTION B2 |

FIG. 2

MEMORY ACCESS APPARATUS

CROSS-REFERENCE TO RELATED APPLICATION

This application claims the benefit of priority to Japanese Patent Application No. 2006-256162, filed Sep. 21, 2006, of which full contents are incorporated herein by reference.

BACKGROUND OF THE INVENTION

1. Field of the Invention

The present invention relates to a memory access apparatus.

2. Description of the Related Art

A processing circuit such as a DSP (Digital Signal Processor), in some cases, incorporates a plurality of memories for performing data processing at a high speed. For example, the DSP disclosed in Japanese Patent Application Laid-Open Publication No. 2006-190389 is equipped with two memories for storing data and has two sets of address bus and data bus provided for enabling simultaneous access to these two memories. Such a DSP realizes a speed-up of arithmetic processing, for example, by simultaneously reading out from the two memories by way of two buses two pieces of data to be input to a multiply accumulator (MAC).

A conceivable technique to achieve a further speed-up of the arithmetic processing in the DSP is providing a plurality of multiply accumulators. However, even if two multiply accumulators are provided, for example, in the DSP capable of simultaneously reading out two pieces of data as described above, it is only two pieces of data that can be simultaneously read out from the memories. For this reason, even if simultaneous arithmetic operations at these two multiply accumulators are attempted, reading out of the data to be input into one multiply accumulator can be performed only after completion of reading out of the data to be input into the other multiply accumulator and the speed-up of the arithmetic processing in the DSP can not be effectively achieved.

SUMMARY OF THE INVENTION

According to an aspect of the present invention, a memory access apparatus for accessing a first memory and a second memory, comprises: an address outputting unit configured to output a read address to at least one of the first and the second memories based on a data size and an address in an address space of a read data; an access request outputting unit configured to output a read request to at least one of the first and the second memories based on the data size and the address in the address space of the read data; a data information outputting unit configured to output an information on the data size, and an information on the address, of the read data; and a read data outputting unit configured to generate the read data to be output, from the data output from at least one of the first and the second memories in response to the read address output from the address outputting unit and the read request output from the access request outputting unit, based on the information on the data size and the information on the address that are output from the data information outputting unit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2 is a diagram of an example of a pipeline control in a DSP;

DETAILED DESCRIPTION OF THE INVENTION

At least the following details will become apparent from descriptions of this specification and of the accompanying drawings.

==Circuit Configuration==

Figure 1:
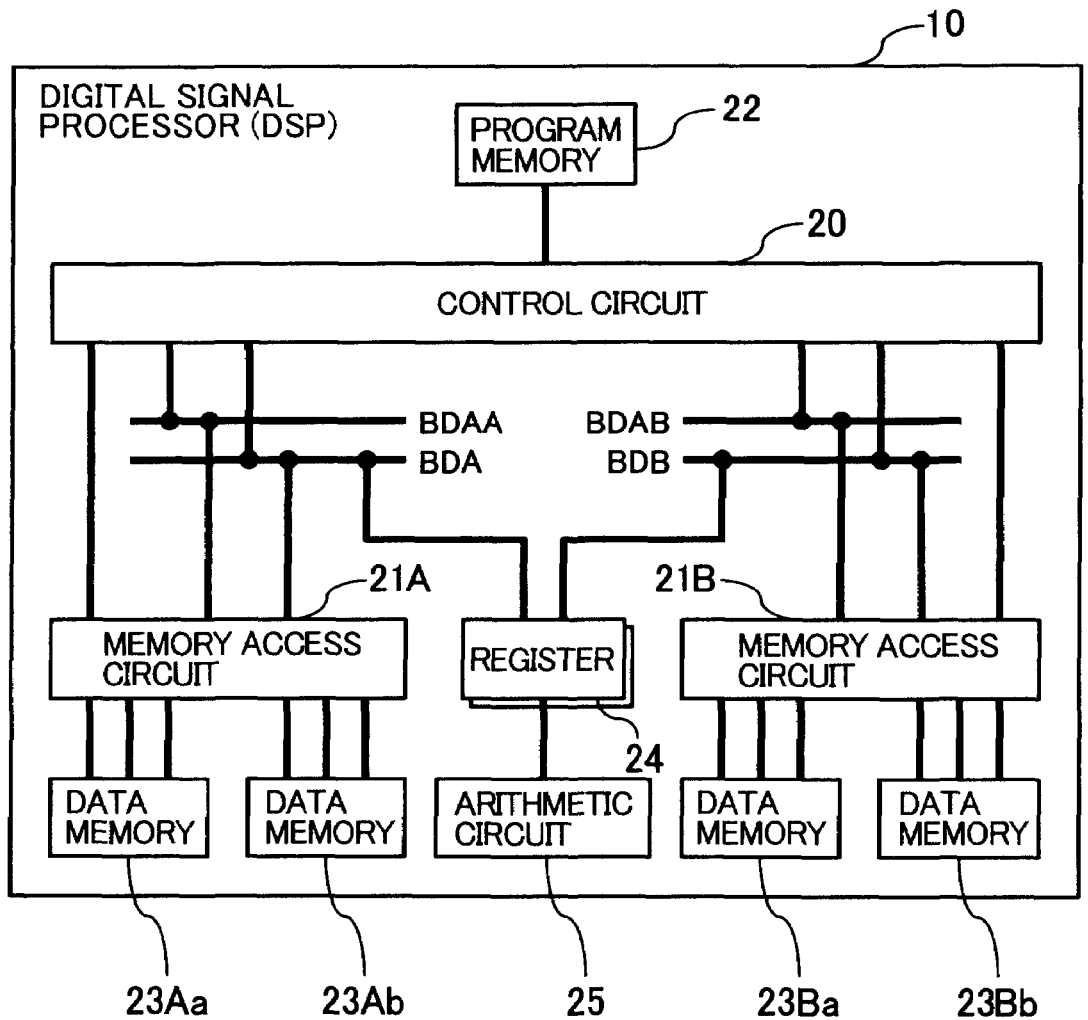
FIG. 1 is a diagram of a configuration example of a digital signal processor as an embodiment of a memory access apparatus according to the present invention.

FIG. 1 is a diagram of a configuration example of a digital signal processor (DSP) as an embodiment of a memory access apparatus according to the present invention.

A control circuit 20 performs various controls in a digital signal processor 10 by reading out and executing a program stored in a program memory 22. The control circuit 20 performs controls such as the control of pipeline processing in the digital signal processor 10, the control of access to data memories 23Aa to 23Bb by way of memory access circuits 21A and 21B, and the control of execution of the arithmetic processing at an arithmetic circuit 25.

The memory access circuit 21A, in accordance with an instruction from the control circuit 20, controls the access to the data memories 23Aa and 23Ab. The memory access circuit 21B, in accordance with the instruction from the control circuit 20, controls the access to the data memories 23Ba and 23Bb.

The program memory 22 is a memory area of a nonvolatile memory such as a flash memory and stores the program to be executed by the control circuit 20. It may be so arranged that the program memory 22 will be provided external to the digital signal processor 10. It may be so arranged that the program memory 22 is a volatile memory, into which the program is read from the outside of the digital signal processor 10.

The data memories 23Aa, 23Ab, 23Ba, and 23Bb are memory area of, for example, SRAM (Static Random Access Memory) etc. and store the data to be used for, or the data generated by, various processing of the DSP 10. It may be so arranged that the data memories 23Aa, 23Ab, 23Ba, and 23Bb will be provided external to the digital signal processor 10.

A register 24 is a memory area composed of a plurality of general-purpose registers etc., and is used mainly as an area of temporary storage of the data read out from the data memories 23Aa, 23Ab, 23Ba, and 23Bb, results of processing at the arithmetic circuit 25, etc.

The arithmetic circuit 25 is a circuit for performing operations of multiplication, addition, etc., using the data stored at the register 24 as input data. The arithmetic circuit 25 contains two multiply accumulators (MAC) and can simultaneously perform operation at these two multiply accumulators by reading out four pieces of data from the register 24 at the same time.

FIG. 2 is a diagram of an example of a pipeline control at the DSP 10. The DSP 10 performs the pipeline control under the control of the control circuit 20. In the pipeline control, a sequence of processing is divided into a plurality of stages and operations at respective stages of a plurality of processing are executed in parallel. In the example of FIG. 2, a sequence of processing is divided into five stages of a fetch stage (stage F), a decode stage (stage D), an address generation stage (stage A), an execution stage (stage E1), and another execution stage (stage E2). For example, at the stage F of time (clock cycle) T1, the fetch of the processing A (fetch A) is executed and then at the stage D of time T2, the decode (decode A) of the fetched instruction is executed. Thereafter, at the stage A of time T3, the address generation (address A) is executed for accessing the data, at the stage E1 of time T4, for example, a multiplication etc. is executed (execution A1), and at the stage E2 of time T5, an addition etc. is executed (execution A2). Since the operations at respective stages can be executed in parallel, for example, at the stage F of time T2, the fetch of the processing B (fetch B) is executed and at the stage D of time T3, the decode of the processing B (decode B) is executed.

Figure 3:
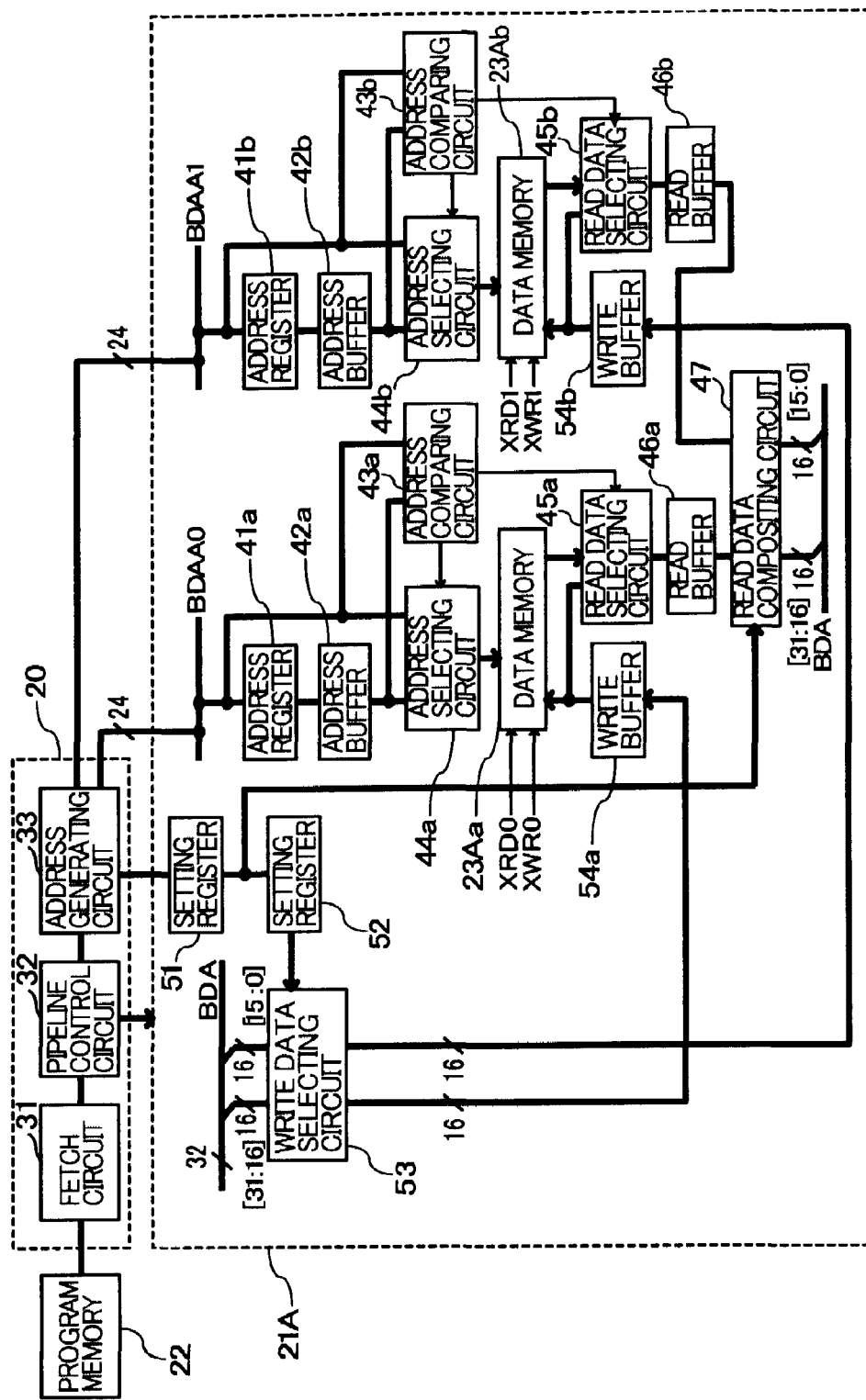
FIG. 3 is a diagram of a detailed configuration example of a control circuit and a memory access circuit in the DSP.

FIG. 3 is a diagram of a detailed configuration example of the control circuit 20 and the memory access circuit 21A in the DSP 10. The data memory 23Aa corresponds to a first memory of the present invention and the data memory 23Ab corresponds to a second memory of the present invention. A pipeline control circuit 32 realizes an access request outputting unit of the present invention and an address generating circuit 33 realizes an address outputting unit and a data information outputting unit of the present invention. A read data selecting circuit 45a, a read buffer 46a, and a read data compositing circuit 47 realize a read data outputting unit of the present invention. A write data selecting circuit 53 realizes a write data outputting unit of the present invention, address buffers 42a and 42b realize a write address memorizing unit of the present invention, and write buffers 54a and 54b realize a write data memorizing unit of the present invention. The memory access circuit 21B is of the same circuit configuration as that of the memory access circuit 21A.

A fetch circuit 31 reads out the program at the address instructed by a program counter from the program memory 22 and outputs the program to the pipeline control circuit 32.

The pipeline control circuit 32 decodes the program output from the fetch circuit 31 and based on an instruction obtained by such decoding, performs the pipeline control of the memory access circuits 21A and 21B and the arithmetic circuit 25. For example, the pipeline control circuit 32 outputs a request to read (XRD0) and a request to write (XWR0) to the data memory 23Aa and a request to read (XRD1) and a request to write (XWR1) to the data memory 23Ab, with an appropriate timing. In the present embodiment, it is assumed that when the request to read (XRD0) is "0", data is read out from the data memory 23Aa and that when the request to write (XWR0) is "0", data is written to the data memory 23Aa. In the present embodiment, it is also assumed that when the request to read (XRD1) is "0", data is read out from the data memory 23Ab and that when the request to write (XWR1) is "0", data is written to the data memory 23Ab.

The address generating circuit 33, based on the result of decoding of the program, generates an address for accessing at least one of the data memories 23Aa and 23Ab and outputs the address to an address bus BDAA. In the present embodiment, the address for the data memory 23Aa is output to the address bus BDAA0 and the address for the data memory 23Ab is output to the address bus BDAA1.

Figure 4:
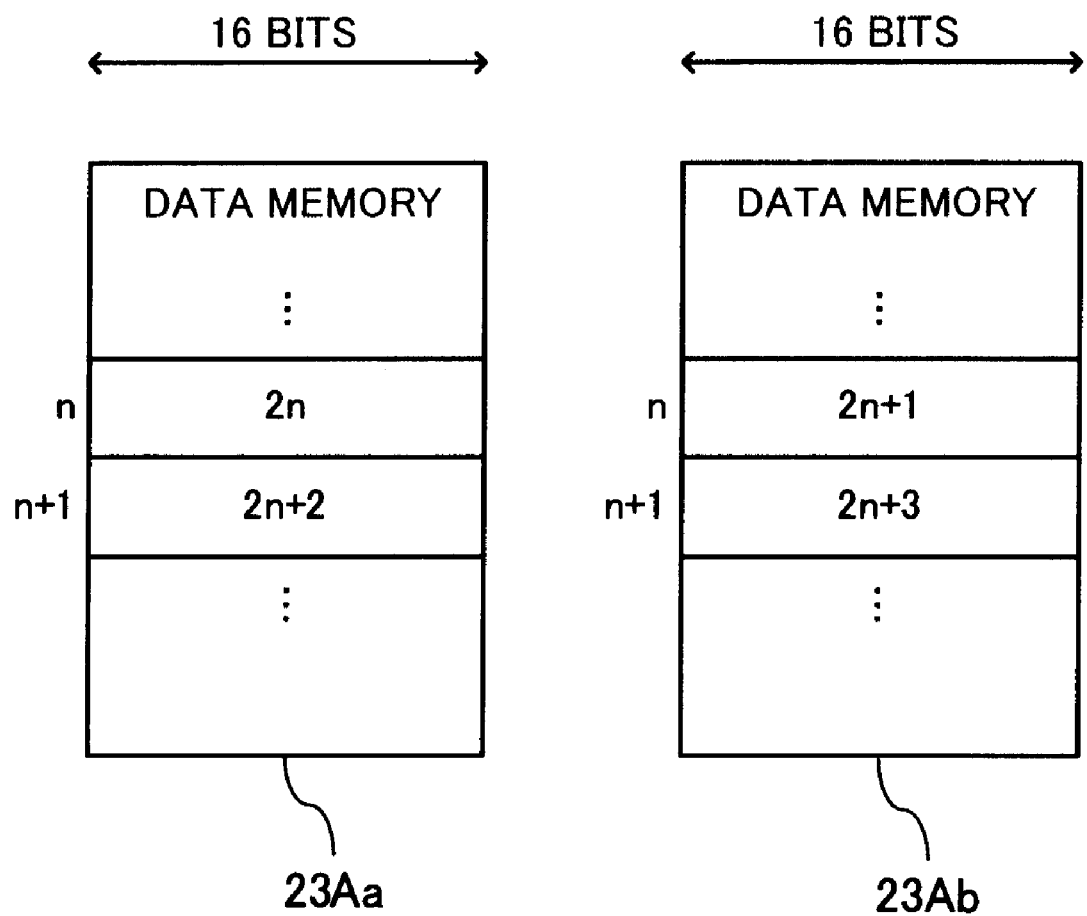
FIG. 4 is a diagram of an address organization example of a data memory.

Specific description will be made of the address generation in the address generating circuit 33. FIG. 4 is a diagram of an address organization example of the data memories 23Aa and 23Ab. The data memories 23Aa and 23Ab have, for example, a 16-bit (N bit) data width and the data memory 23Aa stores data having even-number addresses in the address space of the DSP 10 and the data memory 23Ab stores data having odd-number addresses in the address space of the DSP 10. For example, the data at location 2n of the address space of the DSP 10 is stored at location n of the data memory 23Aa and the data at location 2n+1 of the address space of the DSP 10 is stored at location n of the data memory 23Ab.

Figure 5A:
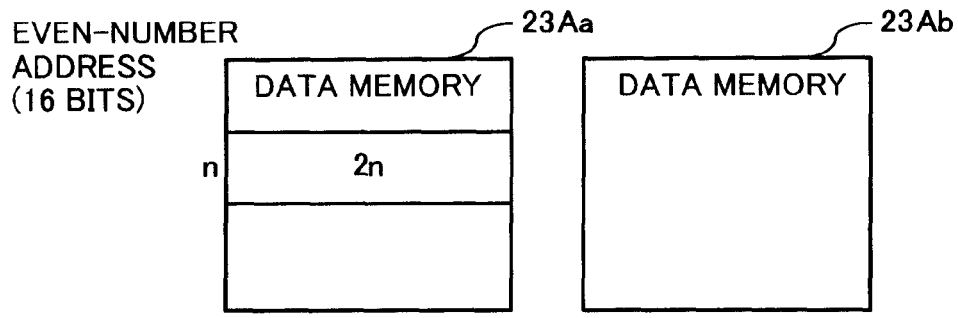
FIG. 5A is a diagram of an access pattern when the data size is 16 bits and the address is of an even number.
Figure 5B:
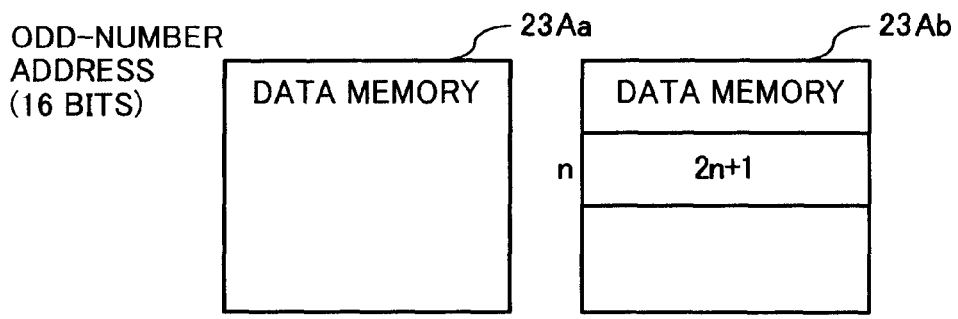
FIG. 5B is a diagram of an access pattern when the data size is 16 bits and the address is of an odd number.
Figure 5C:
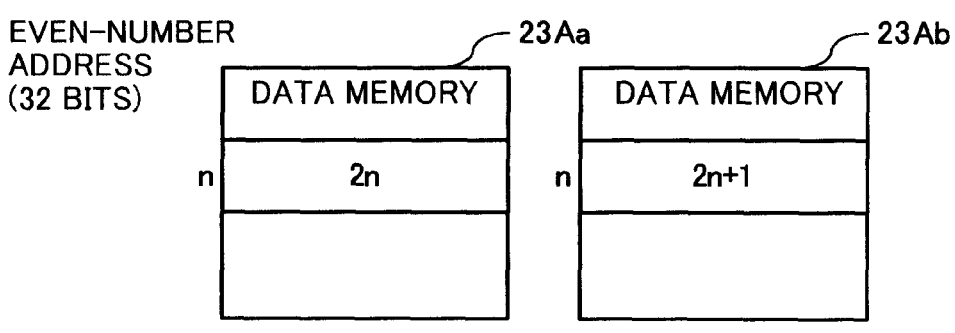
FIG. 5C is a diagram of an access pattern when the data size is 32 bits and the address is of an even number.
Figure 5D:
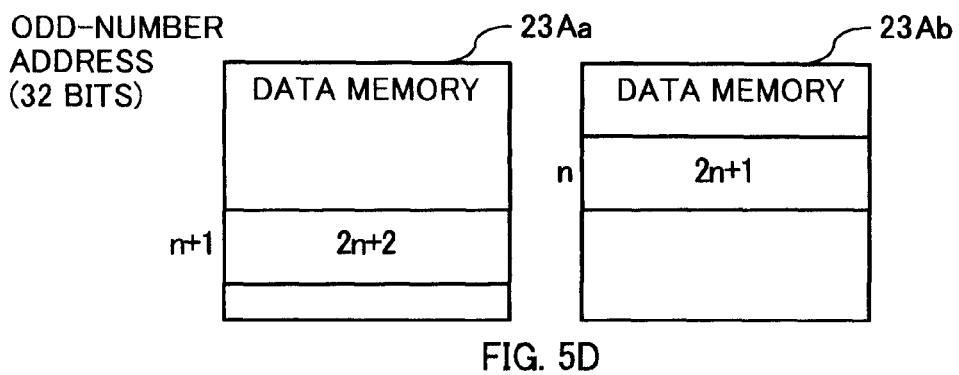
FIG. 5D is a diagram of an access pattern when the data size is 32 bits and the address is of an odd number.

FIGS. 5A to 5D are diagrams of patterns of access to the data memories 23Aa and 23Ab. FIG. 5A is a diagram of the access when the data to be accessed has the address in the address space of the DSP 10 that is of an even number ($2n$) and has the data size of 16 bits. In this case, the address generating circuit 33, based on the address in the address space (location $2n$) and the data size (16 bits), generates the address to the data memory 23Aa (location n) and outputs it to the address bus BDAA0. FIG. 5B is a diagram of the access when the data to be accessed has the address in the address space of the DSP 10 that is of an odd number ($2n+1$) and has the data size of 16 bits. In this case, the address generating circuit 33, based on the address in the address space (location $2n+1$) and the data size (16 bits), generates the address to the data memory 23Ab (location n) and outputs it to the address bus BDAA1. FIG. 5C is a diagram of the access when the data to be accessed has the address in the address space of the DSP 10 that is of an even number ($2n$) and has the data size of 32 bits. In this case, the address generating circuit 33, based on the address in the address space (location $2n$) and the data size (32 bits), generates the address to the data memories 23Aa and 23Ab (location n) and outputs it to the address buses BDAA0 and BDAA1. FIG. 5D is a diagram of the access when the data to be accessed has the address in the address space of the DSP 10 that is of an odd number ($2n+1$) and has the data size of 32 bits. In this case, the address generating circuit 33, based on the address in the address space (location $2n+1$) and the data size (32 bits), generates the address to the data memory 23Ab (location n) and outputs it to the address bus BDAA1 and at the same time, generates the address to the data memory 23Aa (location n+1) and outputs it to the address bus BDAA0.

An address register 41a stores the address output to the address bus BDAA0 in the case of writing the data to the data memory 23Aa. An address register 41b stores the address output to the address bus BDAA1 in the case of writing the data to the data memory 23Ab. Specifically, the address being output to the address bus BDAA0 at stage E1 is taken into the address register 41a at stage E2 and the address being output to the address bus BDAA1 at stage E1 is taken into the address register 41b at stage E2.

An address buffer 42a stores the address memorized in the address register 41a in the case of writing the data to the data memory 23Aa. An address buffer 42b stores the address memorized in the address register 41b in the case of writing the data to the data memory 23Ab. Specifically, the address memorized in the address register 41a at stage E2 is taken into the address buffer 42a at the next clock cycle and the address memorized in the address register 41b at stage E2 is taken into the address buffer 42b at the next clock cycle.

An address comparing circuit 43a outputs the result of comparison between the address being output to the address bus BDAA0 and the address stored in the address buffer 42a. An address comparing circuit 43b outputs the result of comparison between the address being output to the address bus BDAA1 and the address stored in the address buffer 42b.

An address selecting circuit 44a, based on the result of comparison output from the address comparing circuit 43a, outputs either one of the address being output to the address bus BDAA0 and the address stored in the address buffer 42a to an address input terminal of the data memory 23Aa. Specifically, when the read address to the data memory 23Aa being output to the address bus BDAA0 and the write address to the data memory 23Aa stored in the address buffer 42a are the same, the write address stored in the address buffer 42a is output to the data memory 23Aa and when these two addresses are different, the read address being output to the address bus BDAA0 is output to the data memory 23Aa. An address selecting circuit 44b, based on the result of comparison output from the address comparing circuit 43b, outputs either one of the address being output to the address bus BDAA1 and the address stored in the address buffer 42b to an address input terminal of the data memory 23Ab. Specifically, when the read address to the data memory 23Ab being output to the address bus BDAA1 and the write address to the data memory 23Ab stored in the address buffer 42b are the same, the write address stored in the address buffer 42b is output to the data memory 23Ab and when these two addresses are different, the read address being output to the address bus BDAA1 is output to the data memory 23Ab.

The read data selecting circuit 45a, based on the result of comparison output from the address comparing circuit 43a, outputs either one of the data output from a data output terminal of the data memory 23Aa and the data scheduled to be written to the data memory 23Aa that is stored in the write buffer 54a to the read buffer 46a. Specifically, when the read address to the data memory 23Aa that is being output to the address bus BDAA0 and the write address to the data memory 23Aa that is stored in the address buffer 42a are the same, the data stored in the write buffer 54a is output to the read buffer 46a and when these two addresses are different, the data output from the data output terminal of the data memory 23Aa is output to the read buffer 46a. A read data selecting circuit 45b, based on the result of comparison output from the address comparing circuit 43b, outputs either one of the data output from a data output terminal of the data memory 23Ab and the data scheduled to be written to the data memory 23Ab that is stored in the write buffer 54b to the read buffer 46b. Specifically, when the read address to the data memory 23Ab that is being output to the address bus BDAA1 and the write address to the data memory 23Ab that is stored in the address buffer 42b are the same, the data stored in the write buffer 54b is output to the read buffer 46b and when these two addresses are different, the data output from the data output terminal of the data memory 23Ab is output to the read buffer 46b.

The read buffer 46a stores the data output from the read data selecting circuit 45a. Specifically, when the data is read out from the data memory 23Aa, the read address is output to the address bus BDAA0 at stage A, the data is read out from the data memory 23Aa or the write buffer 54a at stage E1, and the read out data is stored in the read buffer 46a at stage E2. The read buffer 46b stores the data output from the read data selecting circuit 45b. Specifically, when the data is read out from the data memory 23Ab, the read address is output to the address bus BDAA1 at stage A, the data is read out from the data memory 23Ab or the write buffer 54b at stage E1, and the read out data is stored in the read buffer 46b at stage E2.

The read data compositing circuit 47, based on the information on the data size and the information on the address memorized in a setting register 51, generates the read data from the data stored in at least one of the read buffers 46a and 46b and output it to the data bus BDA. Specifically, when the data size of the read data is 16 bits and the address in the address space of the read data is of an even number (case of FIG. 5A), the data stored in the read buffer 46a is output to the low-order 16 bits [15:0] of the data bus BDA. When the data size of the read data is 16 bits and the address in the address space of the read data is of an odd number (case of FIG. 5B), the data stored in the read buffer 46b is output to the low-order 16 bits [15:0] of the data bus BDA. When the data size of the read data is 32 bits and the address in the address space of the read data is of an even number (case of FIG. 5C), the data stored in the read buffer 46a is output to the high-order 16 bits [31:16] of the data bus BDA and the data stored in the read buffer 46b is output to the low-order 16 bits [15:0] of the data bus BDA. When the data size of the read data is 32 bits and the address in the address space of the read data is of an odd number (case of FIG. 5D), the data stored in the read buffer 46b is output to the high-order 16 bits [31:16] of the data bus BDA and the data stored in the read buffer 46a is output to the low-order 16 bit [15:0] of the data bus BDA.

The setting register 51 stores the information on the data size and the information on the address in the address space, with respect to the read data from the data memories 23Aa and 23Ab or the write data to the data memories 23Aa and 23Ab. In the present embodiment, it is assumed that the information on the data size is represented by "1" when the data size is 16 bits and by "0" when the data size is 32 bits. In the present embodiment, it is also assumed that the information on the address is represented by "0" when the address is of an even number and by "1" when the address is of an odd number.

A setting register 52 stores the data set in the setting register 51 in case the data is written to the data memory 42a or the data memory 42b. Specifically, the data set in the setting register 51 at stage E1 is taken into the setting register 52 at stage E2.

The write data selecting circuit 53, based on the information on data size and the information on the address stored in the setting register 52, outputs the write data being output to the data bus BDA to at least one of the write buffers 54a and 54b. Specifically, when the data size of the write data is 16 bits and the address in the address space of the write data is of an even number (case of FIG. 5A), the data being output to the low-order 16 bits [15:0] of the data bus BDA is output to the write buffer 54a. When the data size of the write data is 16 bits and the address in the address space of the write data is of an odd number (case of FIG. 5B), the data being output to the low-order 16 bits [15:0] of the data bus BDA is output to the write buffer 54b. When the data size of the write data is 32 bits and the address in the address space of the write data is of an even number (case of FIG. 5C), the data being output to the high-order 16 bits [31:16] of the data bus BDA is output to the write buffer 54a and the data being output to the low-order 16 bits [15:0] of the data bus BDA is output to the write buffer 54b. When the data size of the write data is 32 bits and the address in the address space of the write data is of an odd number (case of FIG. 5D), the data being output to the high-order 16 bits [31:16] of the data bus BDA is output to the write buffer 54b and the data being output to the low-order 16 bits [15:0] of the data bus BDA is output to the write buffer 54a.

==Memory Access Operation==

Description will be made of a memory access operation in the DSP 10, with reference to FIGS. 6 to 23. In FIGS. 6 to 21, a part related to the memory access operation is indicated by a solid line and a part unrelated to the memory access operation is indicated by a dashed line.

Figure 6:
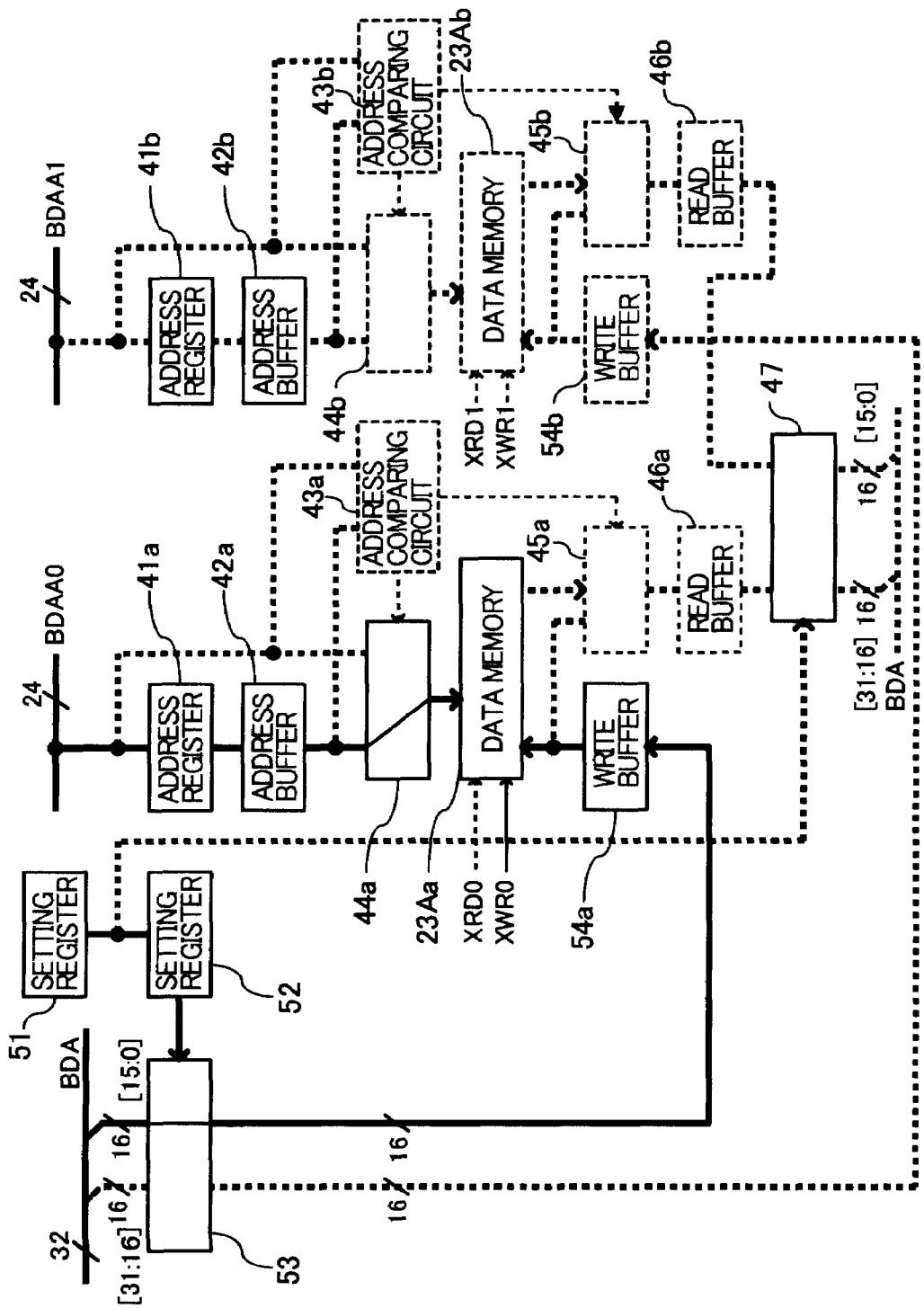
FIG. 6 is a diagram of a write operation when the data size is 16 bits and the address is of an even number.

FIG. 6 is a diagram of a write operation when the data size is 16 bits and the address in the address space is of an even number. Since the address in the address space is of an even number, the address generating circuit 33 generates the write address to the data memory 23Aa at stage A. Next, at stage E1, thus generated write address is output to the address bus BDAA0. Then, at stage E2, the write address output to the address bus BDAA0 is taken into the address register 41a and at the same time, the 16-bit write data is output to the low-order 16 bits [15:0] of the data bus BDA. At stage E1, the address generating circuit 33 also writes "1" as the information indicating that the data size is 16 bits and "0" as the information indicating that the address is of an even number to the setting register 51. The information written to the setting register 51 is taken into the setting register 52 at stage E2.

At the clock cycle following stage E2, the address stored in the address register 41a is taken into the address buffer 42a and the write data selecting circuit 53, in accordance with the information stored in the setting register 52, outputs the data being output to the low-order 16 bits [15:0] of the data bus BDA to the write buffer 54a.

In the case of FIG. 6, with the write operation not being followed by the read operation, the address selecting circuit 44a, under control of the pipeline control circuit 32, inputs the address stored in the address buffer 42a to the address input terminal of the data memory 23Aa. Thereafter, by the outputting of the request to write (XWR0="0") from the pipeline control circuit 32 to the data memory 23Aa, the data stored in the write buffer 54a is written to the data memory 23Aa.

Figure 7:
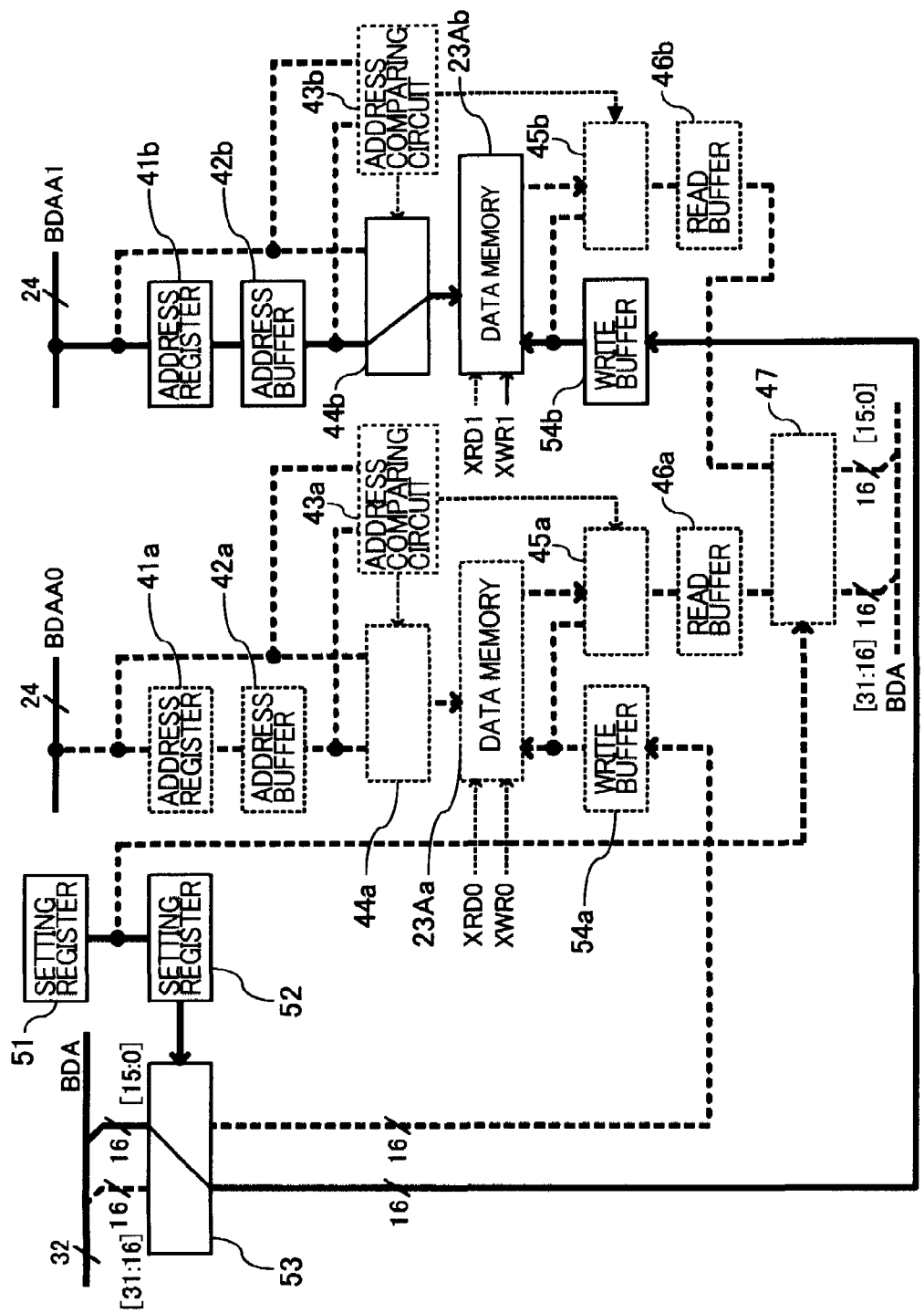
FIG. 7 is a diagram of a write operation when the data size is 16 bits and the address is of an odd number.

FIG. 7 is a diagram of a write operation when the data size is 16 bits and the address in the address space is of an odd number. Since the address in the address space is of an odd number, the address generating circuit 33 generates the write address to the data memory 23Ab at stage A. Next, at stage E1, thus generated write address is output to the address bus BDAA1. Then, at stage E2, the write address output to the address bus BDAA1 is taken into the address register 41b and at the same time, the 16-bit write data is output to the low-order 16 bits [15:0] of the data bus BDA. At stage E1, the address generating circuit 33 also writes "1" as the information indicating that the data size is 16 bits and "1" as the information indicating that the address is of an odd number to the setting register 51. The information written to the setting register 51 is taken into the setting register 52 at stage E2.

At the clock cycle following stage E2, the address stored in the address register 41b is taken into the address buffer 42b and the write data selecting circuit 53, in accordance with the information stored in the setting register 52, outputs the data being output to the low-order 16 bits [15:0] of the data bus BDA to the write buffer 54b.

In the case of FIG. 7, with the write operation not being followed by the read operation, the address selecting circuit 44b, under control of the pipeline control circuit 32, inputs the address stored in the address buffer 42b to the address input terminal of the data memory 23Ab. Thereafter, by the outputting of the request to write (XWR1="0") from the pipeline control circuit 32 to the data memory 23Ab, the data stored in the write buffer 54b is written to the data memory 23Ab.

Figure 8:
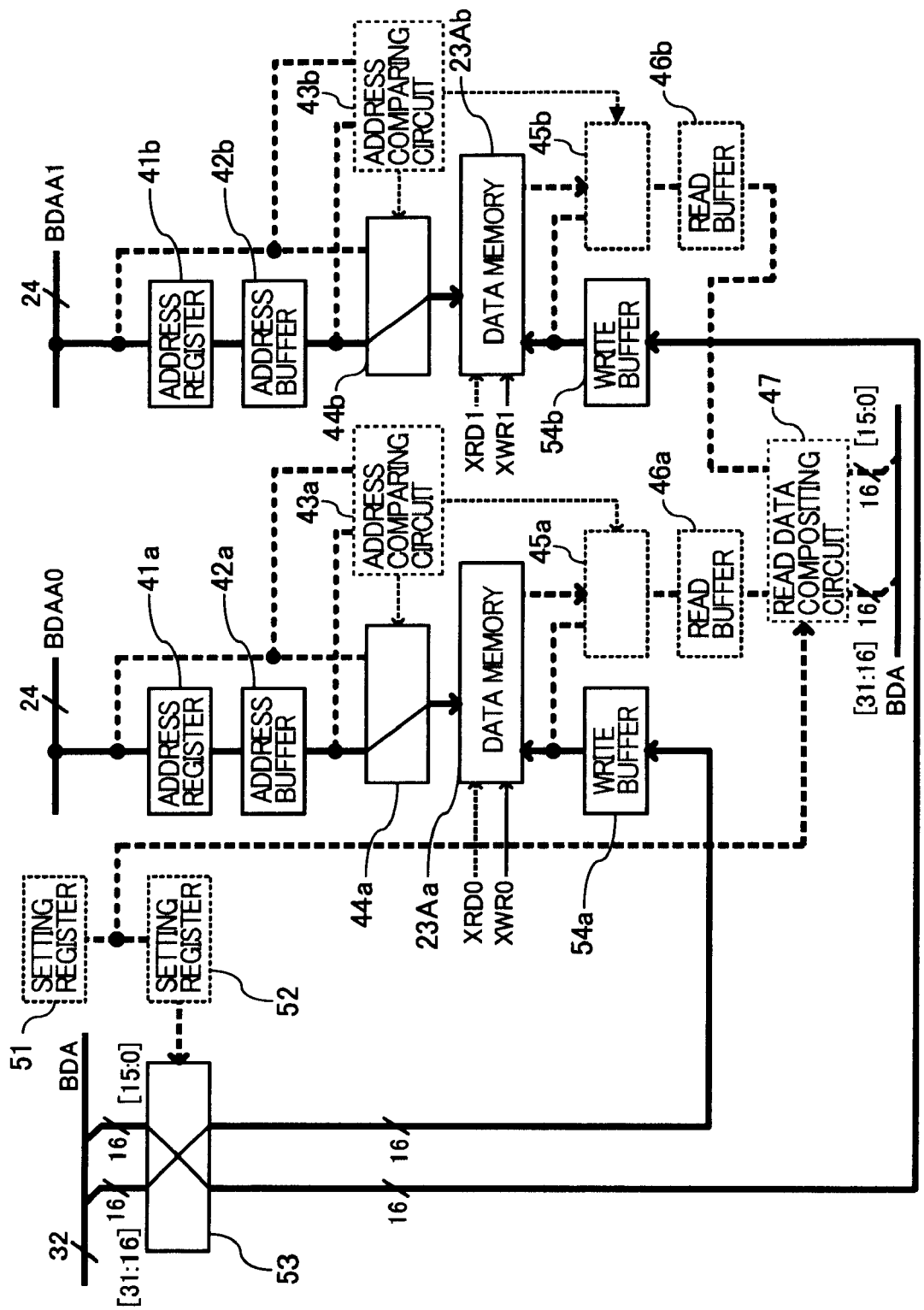
FIG. 8 is a diagram of a write operation when the data size is 32 bits and the address is of an even number.

FIG. 8 is a diagram of a write operation when the data size is 32 bits and the address in the address space is of an even number. At stage A, the address generating circuit 33 generates the write addresses to the data memories 23Aa and 23Ab. Next, at stage E1, the write addresses to the data memories 23Aa and 23Ab are output to the address buses BDAA0 and BDAA1, respectively. Then, at stage E2, the write addresses output to the address buses BDAA0 and BDAA1 are taken into the address registers 41a and 41b, respectively. Also at stage E2, the write data is output to the data bus BDA [31:0]. At stage E1, the address generating circuit 33 also writes "0" as the information indicating that the data size is 32 bits and "0" as the information indicating that the address is of an even number to the setting register 51. The information written to the setting register 51 is taken into the setting register 52 at stage E2.

At the clock cycle following stage E2, the addresses stored in the address registers 41a and 41b are taken into the address buffers 42a and 42b, respectively, and the write data selecting circuit 53, in accordance with the information stored in the setting register 52, outputs the data being output to the high-order 16 bits [31:16] of the data bus BDA to the write buffer 54*a* and outputs the data being output to the low-order 16 bits [15:0] of the data bus BDA to the write buffer 54*b*.

In the case of FIG. 8, with the write operation not being followed by the read operation, the address selecting circuits 44*a* and 44*b*, under control of the pipeline control circuit 32, inputs the addresses stored in the address buffers 42*a* and 42*b* to the address input terminal of the data memories 23Aa and 23Ab, respectively. Thereafter, by the outputting of the request to write (XWR0="0", XWR1="0") from the pipeline control circuit 32 to the data memories 23Aa and 23Ab, the data stored in the write buffers 54*a* and 54*b* are written to the data memories 23Aa and 23Ab, respectively.

Figure 9:
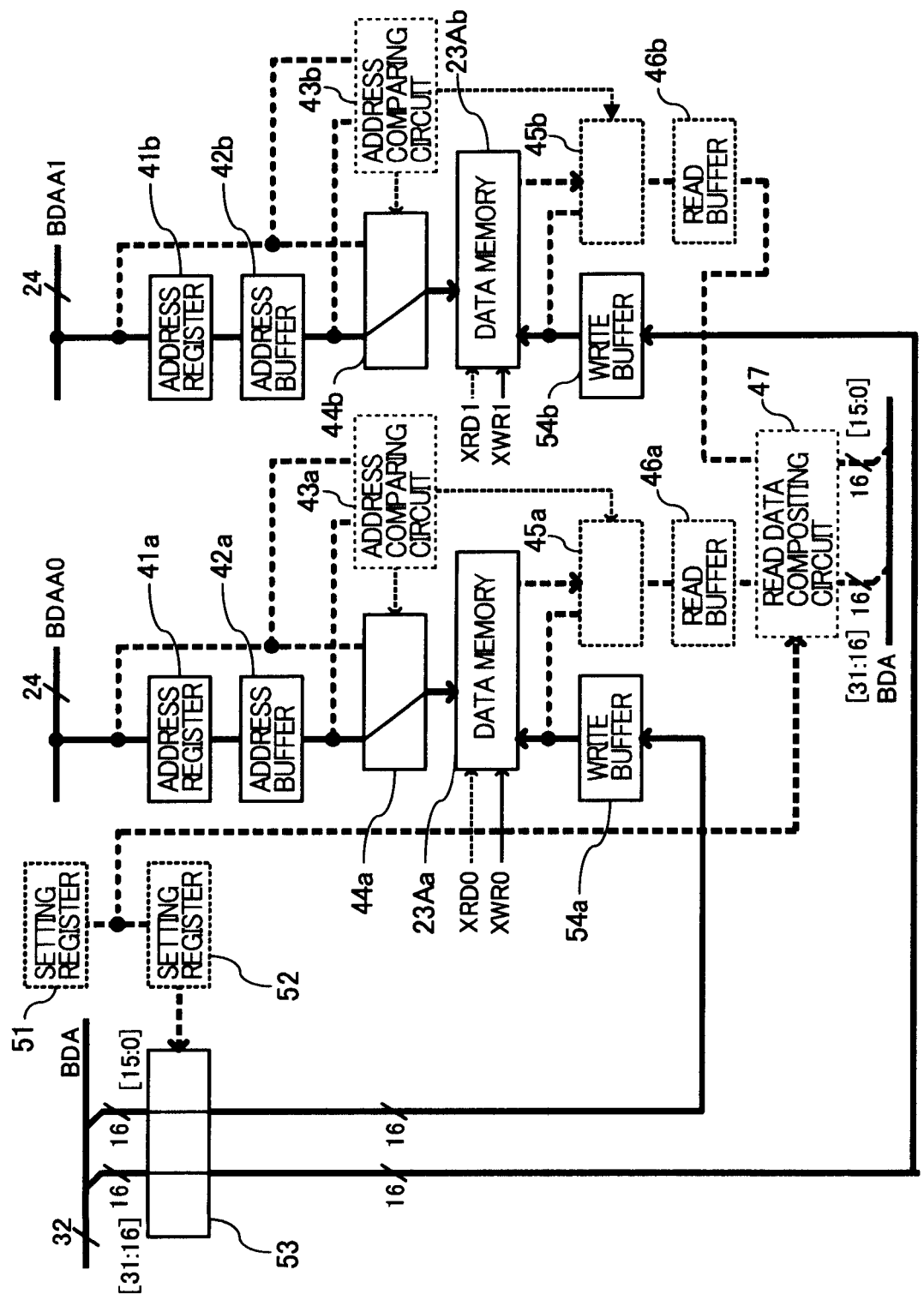
FIG. 9 is a diagram of a write operation when the data size is 32 bits and the address is of an odd number.

FIG. 9 is a diagram of a write operation when the data size is 32 bits and the address in the address space is of an odd number. The operation from stage A through stage E2 is the same as in the case of FIG. 8.

At the clock cycle following stage E2, the addresses stored in the address registers 41*a* and 41*b* are taken into the address buffers 42*a* and 42*b*, respectively, and the write data selecting circuit 53, in accordance with the information stored in the setting register 52, outputs the data being output to the high-order 16 bits [31:16] of the data bus BDA to the write buffer 54*b* and outputs the data being output to the low-order 16 bits [15:0] of the data bus BDA to the write buffer 54*a*.

In the case of FIG. 9, with the write operation not being followed by the read operation, the data stored in the write buffers 54*a* and 54*b* are written to the data memories 23Aa and 23Ab, respectively, in the same manner as in the case of FIG. 8.

Figure 10:
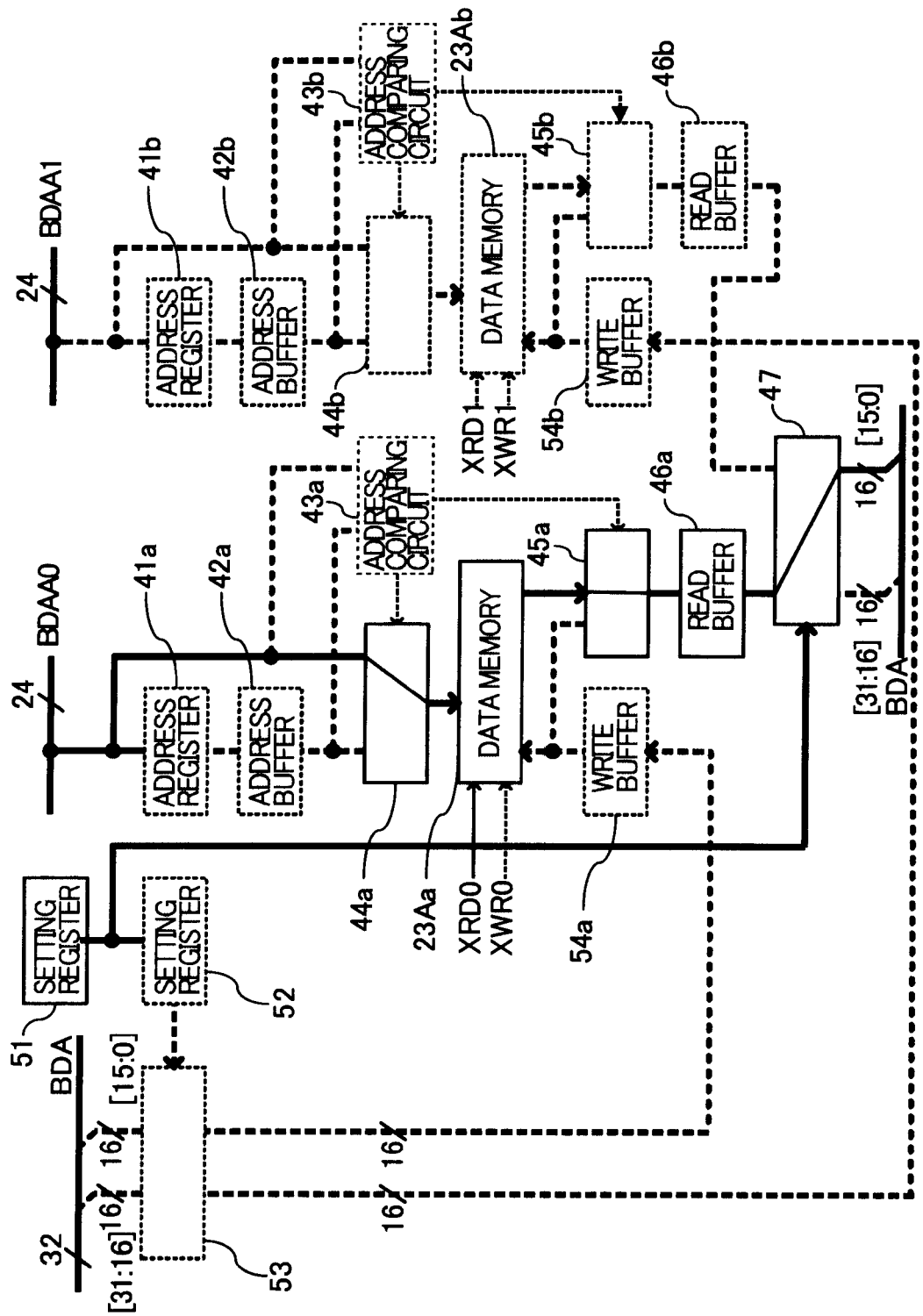
FIG. 10 is a diagram of a read operation when the data size is 16 bits and the address is of an even number.

FIG. 10 is a diagram of a read operation when the data size is 16 bits and the address in the address space is of an even number. Since the address in the address space is of an even number, the address generating circuit 33 generates the read address to the data memory 23Aa at stage A. Next, at stage E1, thus generated read address is output to the address bus BDAA0. At stage E1, the address generating circuit 33 writes "1" as the information indicating that the data size is 16 bits and "0" as the information indicating that the address is of an even number to the setting register 51.

In the case of FIG. 10, with the read operation not being preceded by the write operation, the address selecting circuit 44*a*, under control of the pipeline control circuit 32, inputs the address being output to the address bus BDAA0 to the address input terminal of the data memory 23Aa. Then, with the outputting of the request to read (XRD0="0") from the pipeline control circuit 32 to the data memory 23Aa, corresponding data is output from the data memory 23Aa. With the read operation not being preceded by the write operation, the read data selecting circuit 45*a*, under control of the pipeline control circuit 32, outputs the data output from the data memory 23Aa to the read buffer 46*a* and the read data compositing circuit 47, in accordance with the information stored in the setting register 51, outputs the data stored in the read buffer 46*a* to the low-order 16 bits [15:0] of the data bus BDA.

Figure 11:
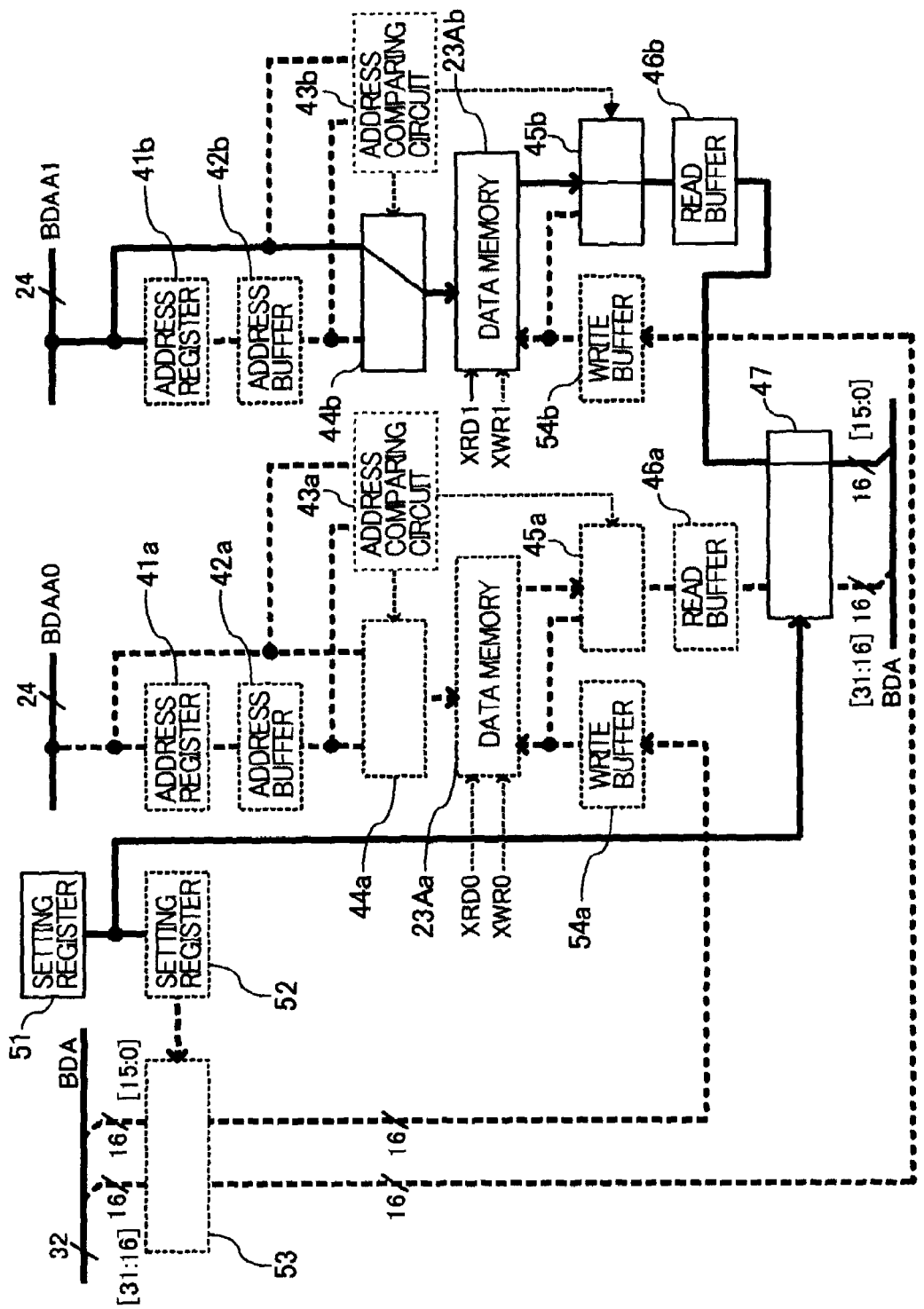
FIG. 11 is a diagram of a read operation when the data size is 16 bits and the address is of an odd number.

FIG. 11 is a diagram of a read operation when the data size is 16 bits and the address in the address space is of an odd number. Since the address in the address space is of an odd number, the address generating circuit 33 generates the read address to the data memory 23Ab at stage A. Next, at stage E1, thus generated read address is output to the address bus BDAA1. At stage E1, the address generating circuit 33 writes "1" as the information indicating that the data size is 16 bits and "1" as the information indicating that the address is of an odd number to the setting register 51.

In the case of FIG. 11, with the read operation not being preceded by the write operation, the address selecting circuit 44*b*, under control of the pipeline control circuit 32, inputs the address being output to the address bus BDAA1 to the address input terminal of the data memory 23Ab. Then, with the outputting of the request to read (XRD1="0") from the pipeline control circuit 32 to the data memory 23Ab, corresponding data is output from the data memory 23Ab. With the read operation not being preceded by the write operation, the read data selecting circuit 45*b*, under control of the pipeline control circuit 32, outputs the data output from the data memory 23Ab to the read buffer 46*b* and the read data compositing circuit 47, in accordance with the information stored in the setting register 51, outputs the data stored in the read buffer 46*b* to the low-order 16 bits [15:0] of the data bus BDA.

Figure 12:
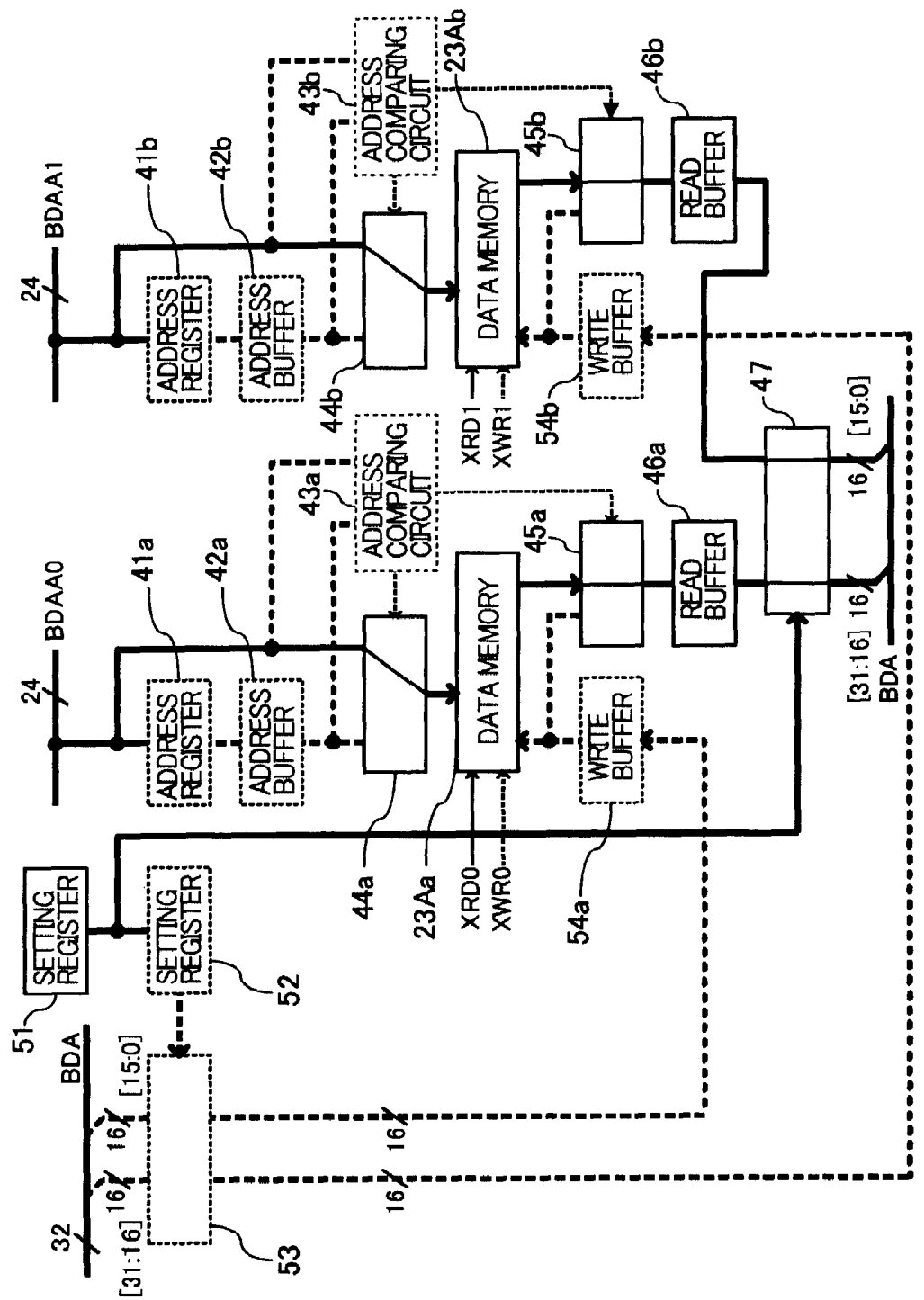
FIG. 12 is a diagram of a read operation when the data size is 32 bits and the address is of an even number.

FIG. 12 is a diagram of a read operation when the data size is 32 bits and the address in the address space is of an even number. At stage A, the address generating circuit 33 generates the read addresses to the data memories 23Aa and 23Ab. Next, at stage E1, the read addresses to the data memories 23Aa and 23Ab are output to the address buses BDAA0 and BDAA1, respectively. At stage E1, the address generating circuit 33 writes "0" as the information indicating that the data size is 32 bits and "0" as the information indicating that the address is of an even number to the setting register 51.

In the case of FIG. 12, with the read operation not being preceded by the write operation, the address selecting circuits 44*a* and 44*b*, under control of the pipeline control circuit 32, input the addresses being output to the address buses BDAA0 and BDAA1 to the address input terminal of the data memories 23Aa and 23Ab, respectively. Then, with the outputting of the request to read (XRD0="0", XRD1="0") from the pipeline control circuit 32 to the data memories 23Aa and 23Ab respectively, corresponding data is output from the data memories 23Aa and 23Ab. With the read operation not being preceded by the write operation, the read data selecting circuits 45*a* and 45*b*, under control of the pipeline control circuit 32, output the data output from the data memories 23Aa and 23Ab to the read buffers 46*a* and 46*b*, respectively, and the read data compositing circuit 47, in accordance with the information stored in the setting register 51, outputs the data stored in the read buffer 46*a* to the high-order 16 bits [31:16] of the data bus BDA and outputs the data stored in the read buffer 46*b* to the low-order 16 bits [15:0] of the data bus BDA.

Figure 13:
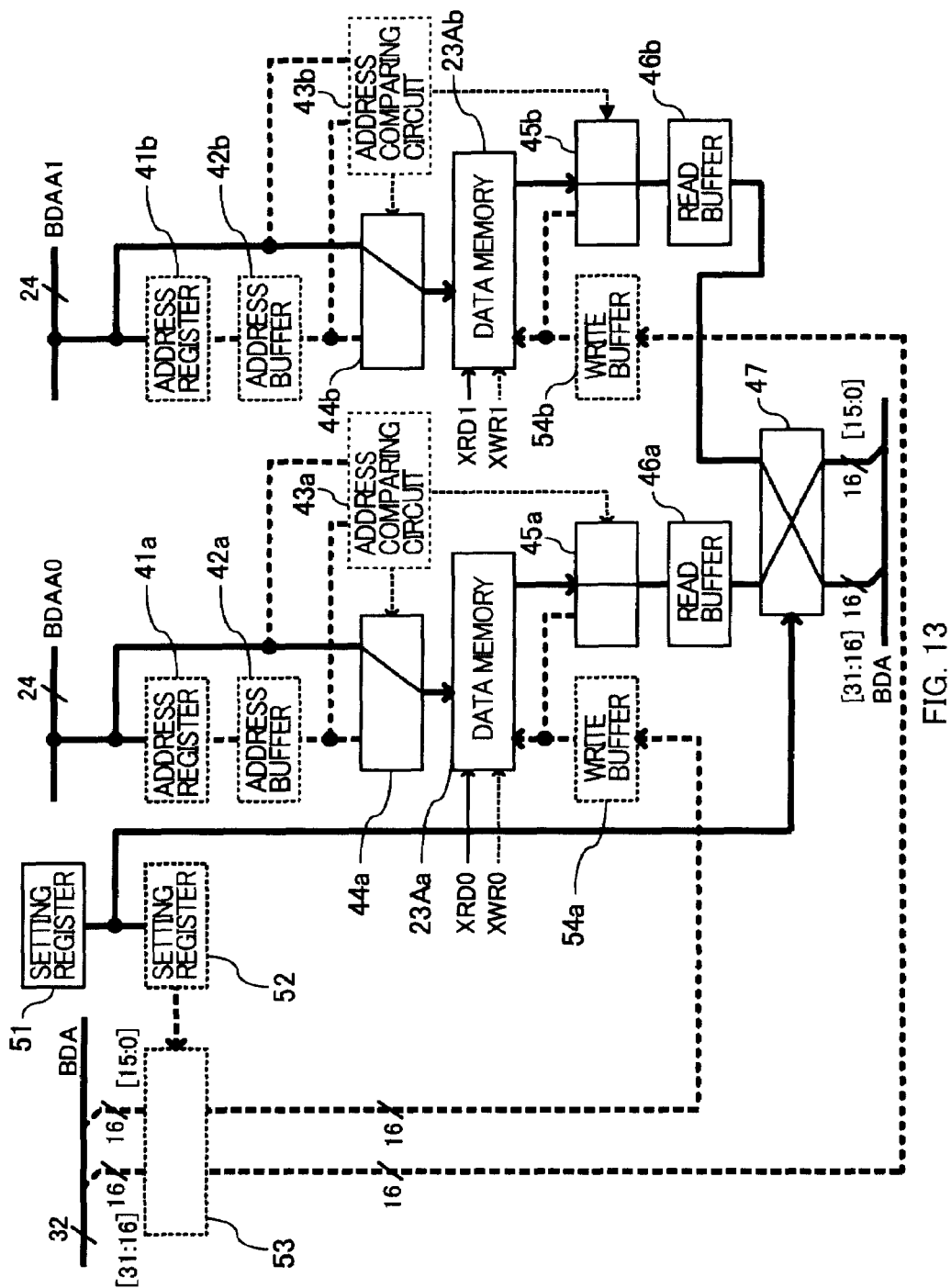
FIG. 13 is a diagram of a read operation when the data size is 32 bits and the address is of an odd number.

FIG. 13 is a diagram of a read operation when the data size is 32 bits and the address in the address space is of an odd number. The operation from stage A through stage E1 is the same as in the case of FIG. 12 except that the information written to the setting register 51 is "1" indicating that the address is of an odd number.

In the case of FIG. 13, with the read operation not being preceded by the write operation, the data output from the data memories 23Aa and 23Ab are output to the read buffers 46*a* and 46*b*, respectively, and the read data compositing circuit 47, in accordance with the information stored in the setting register 51, outputs the data stored in the read buffer 46*b* to the high-order 16 bits [31:16] of the data bus BDA and outputs the data stored in the read buffer 46*a* to the low-order 16 bits [15:0] of the data bus BDA.

Figure 14:
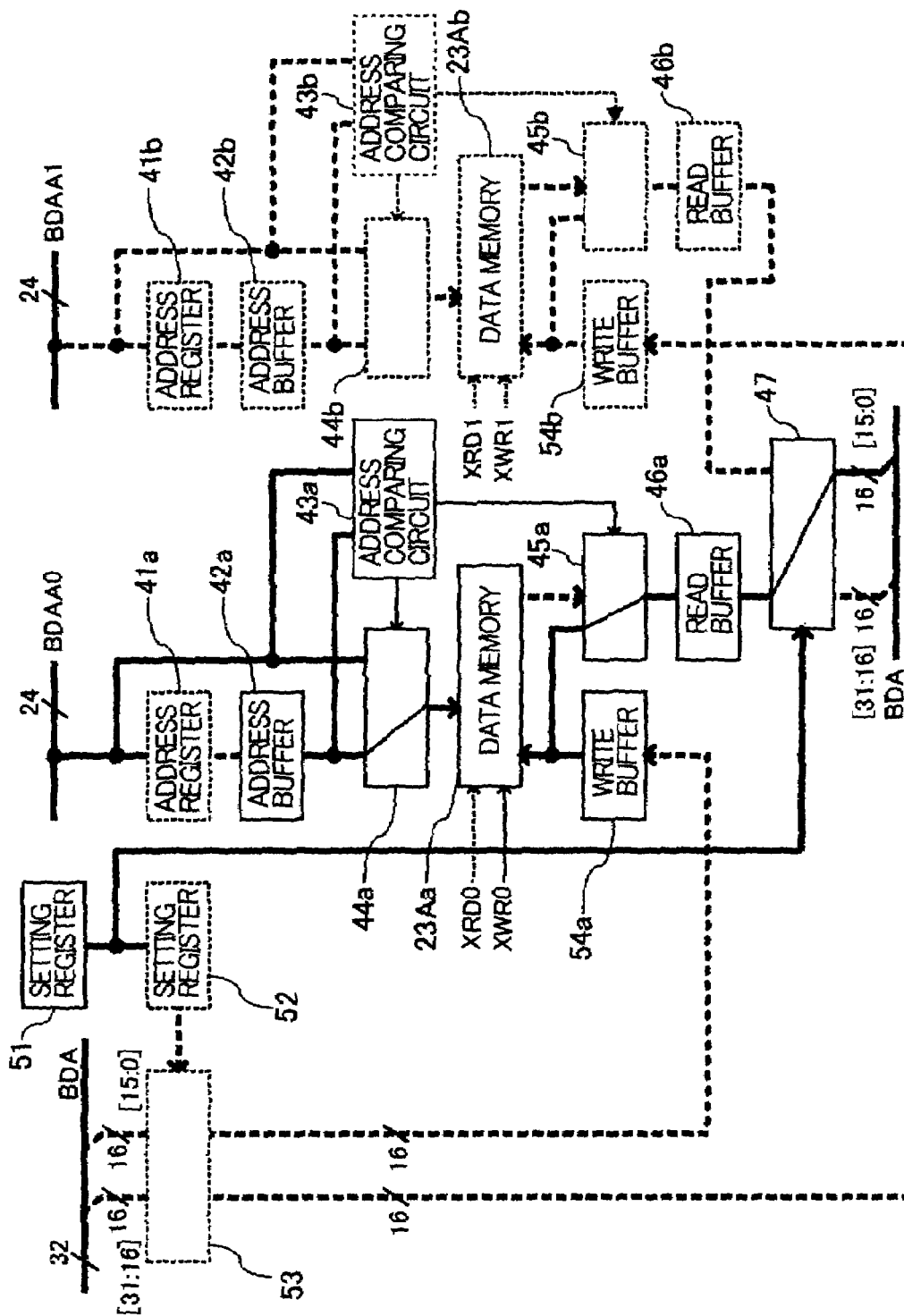
FIG. 14 is a diagram of a read operation following a write operation to the same address when the data size is 16 bits and the address is of an even number.

FIG. 14 is a diagram of a read operation following a write operation to the same address when the data size is 16 bits and the address in the address space is of an even number. Since the address in the address space is of an even number, the address generating circuit 33 generates the read address to the data memory 23Aa at stage A. Next, at stage E1, thus generated read address is output to the address bus BDAA0. At stage E1, the address generating circuit 33 writes "1" as the information indicating that the data size is 16 bits and "0" as the information indicating that the address is of an even number to the setting register 51.

In the case of FIG. 14, with the read operation being preceded by the write operation, the address comparing circuit 43a, under control of the pipeline control circuit 32, outputs the result of comparison between the address being output to the address bus BDAA0 and the address stored in the address buffer 42a. Since these two addresses are the same in the case of FIG. 14, the address selecting circuit 44a, in accordance with the result of comparison output from the address comparing circuit 43a, inputs the address stored in the address buffer 42a to the address input terminal of the data memory 23Aa. The read data selecting circuit 45a, in accordance with the result of comparison output from the address comparing circuit 43a, outputs the data stored in the write buffer 54a to the read buffer 46a. Then, the read data compositing circuit 47, in accordance with the information stored in the setting register 51, outputs the data stored in the read buffer 46a to the low-order 16 bits [15:0] of the data bus BDA. With the outputting of the request to write (XWR0="0") from the pipeline control circuit 32 to the data memory 23Aa, the data stored in the write buffer 54a is written to the data memory 23Aa.

Figure 15:
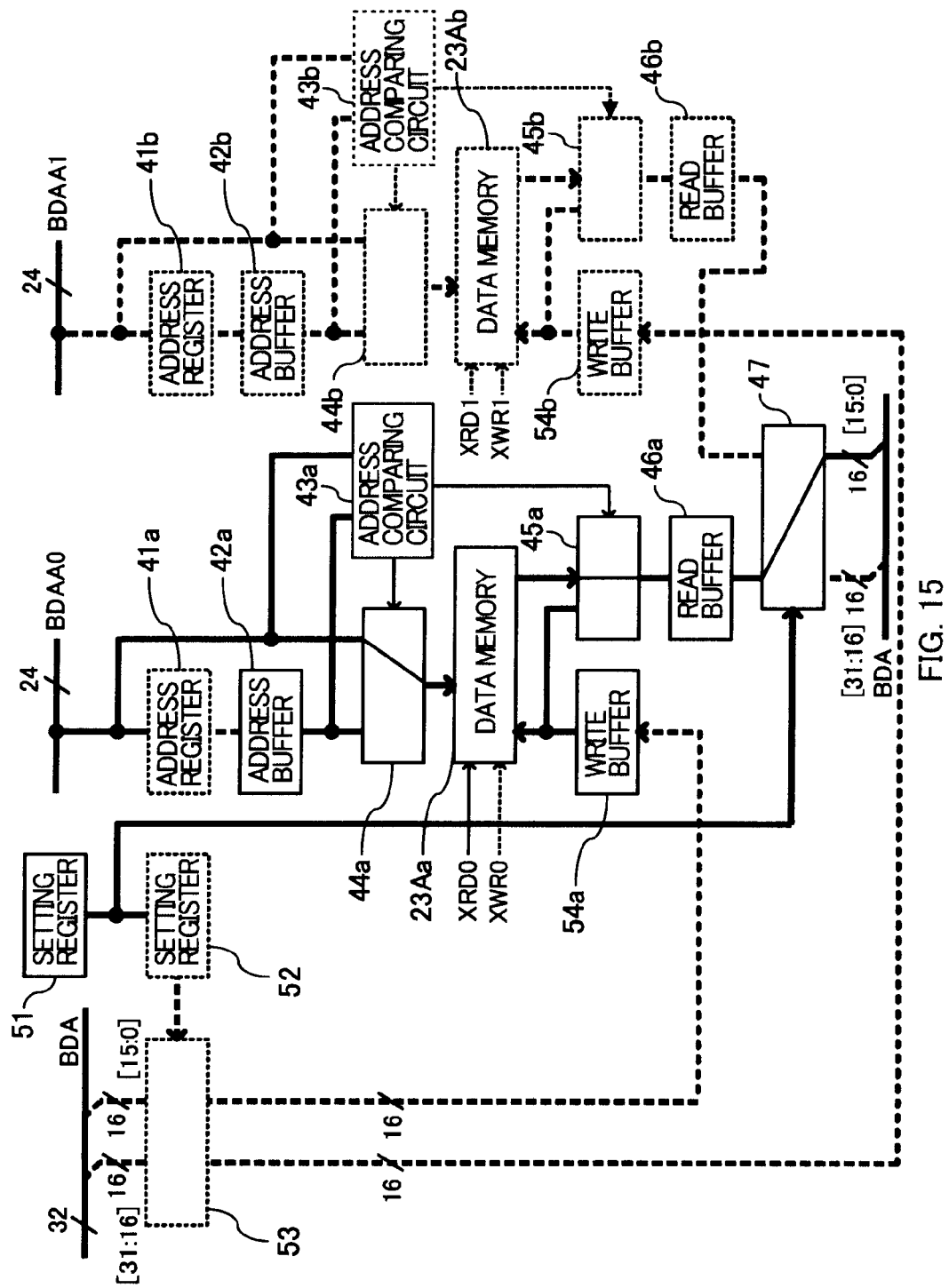
FIG. 15 is a diagram of a read operation to one address following a write operation to another address when the data size is 16 bits and the address is of an even number.

FIG. 15 is a diagram of a read operation to one address following a write operation to another address when the data size is 16 bits and the address in the address space is of an even number. The operation from stage A through stage E1 is the same as in the case of FIG. 14.

In the case of FIG. 15, with the read operation being preceded by the write operation, the address comparing circuit 43a, under control of the pipeline control circuit 32, outputs the result of comparison between the address being output to the address bus BDAA0 and the address stored in the address buffer 42a. Since these two addresses are different in the case of FIG. 15, the address selecting circuit 44a, in accordance with the result of comparison output from the address comparing circuit 43a, inputs the address being output to the address bus BDAA0 to the address input terminal of the data memory 23Aa. With the outputting of the request to read (XRD0="0") from the pipeline control circuit 32 to the data memory 23Aa, corresponding data is output from the data memory 23Aa. The read data selecting circuit 45a, in accordance with the result of comparison output from the address comparing circuit 43a, outputs the data output from the data memory 23Aa to the read buffer 46a. The read data compositing circuit 47, in accordance with the information stored in the setting register 51, outputs the data stored in the read buffer 46a to the low-order 16 bits [15:0] of the data bus BDA. The address stored in the address buffer 42a and the data stored in the write buffer 54a are retained without being cleared. With an appropriate timing after the read out of the data from the data memory 23Aa, the address stored in the address buffer 42a is input to the address input terminal of the data memory 23Aa and, with the outputting of the request to write (XWR0="0"), data is written to the data memory 23Aa.

Figure 16:
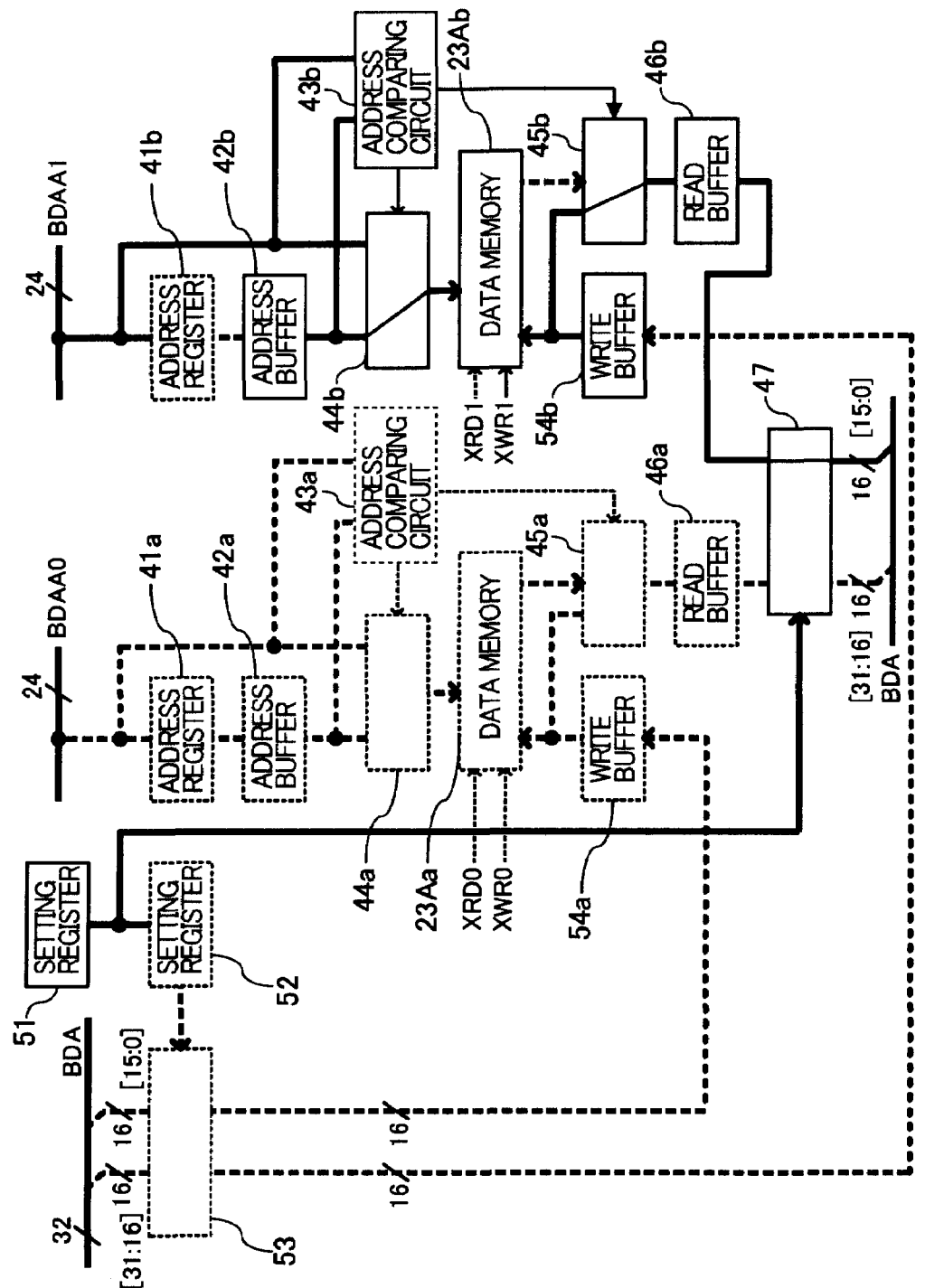
FIG. 16 is a diagram of a read operation following a write operation to the same address when the data size is 16 bits and the address is of an odd number.

FIG. 16 is a diagram of a read operation following a write operation to the same address when the data size is 16 bits and the address in the address space is of an odd number. Since the address in the address space is of an odd number, the address generating circuit 33 generates the read address to the data memory 23Ab at stage A. Next, at stage E1, thus generated read address is output to the address bus BDAA1. At stage E1, the address generating circuit 33 writes "1" as the information indicating that the data size is 16 bits and "1" as the information indicating that the address is of an odd number to the setting register 51.

In the case of FIG. 16, with the read operation being preceded by the write operation, the address comparing circuit 43b, under control of the pipeline control circuit 32, outputs the result of comparison between the address being output to the address bus BDAA1 and the address stored in the address buffer 42b. Since these two addresses are the same in the case of FIG. 16, the address selecting circuit 44b, in accordance with the result of comparison output from the address comparing circuit 43b, inputs the address stored in the address buffer 42b to the address input terminal of the data memory 23Ab. The read data selecting circuit 45b, in accordance with the result of comparison output from the address comparing circuit 43b, outputs the data stored in the write buffer 54b to the read buffer 46b. Then, the read data compositing circuit 47, in accordance with the information stored in the setting register 51, outputs the data stored in the read buffer 46b to the low-order 16 bits [15:0] of the data bus BDA. With the outputting of the request to write (XWR1="0") from the pipeline control circuit 32 to the data memory 23Ab, the data stored in the write buffer 54b is written to the data memory 23Ab.

Figure 17:
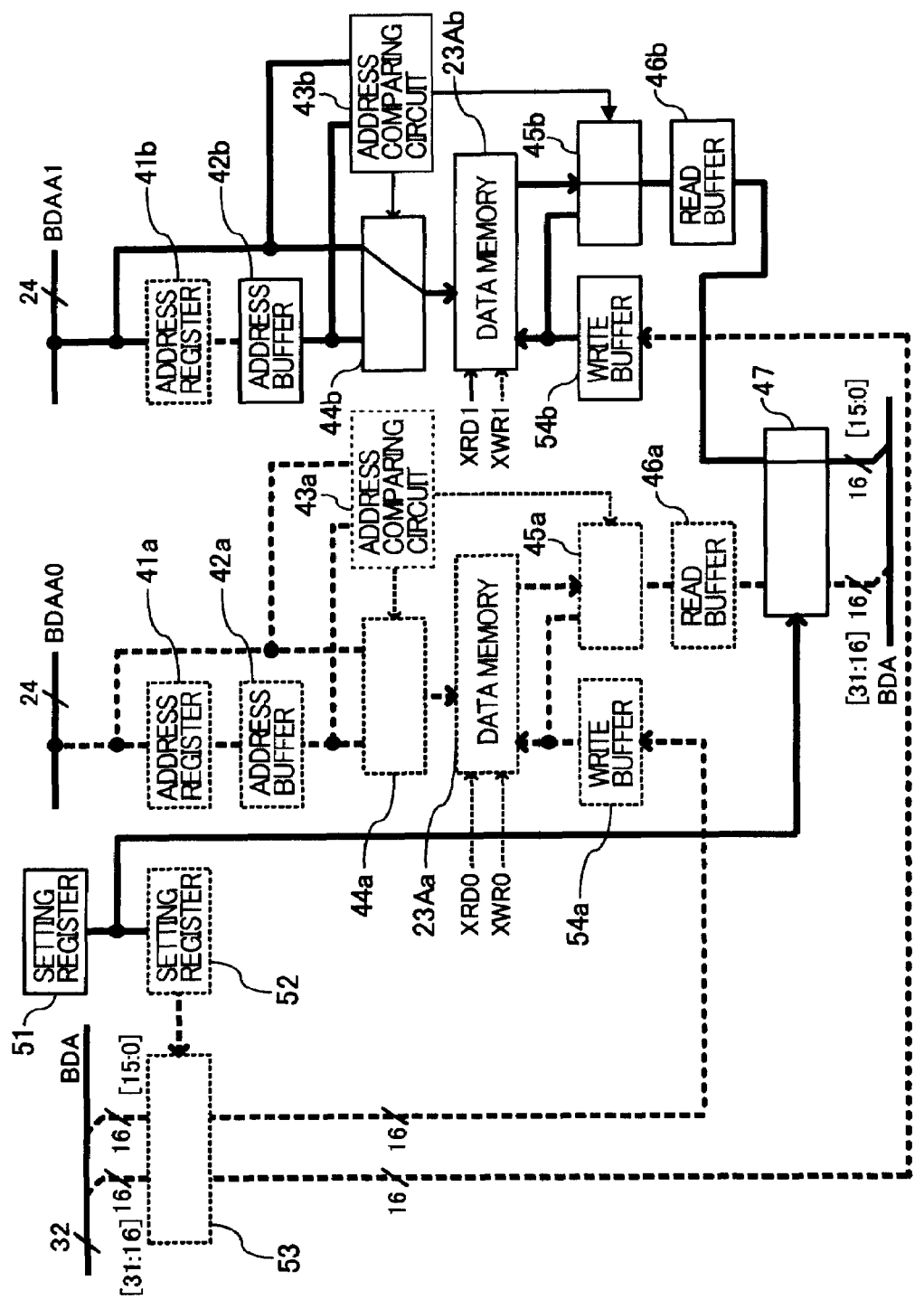
FIG. 17 is a diagram of a read operation to one address following a write operation to another address when the data size is 16 bits and the address is of an odd number.
Figure 18:
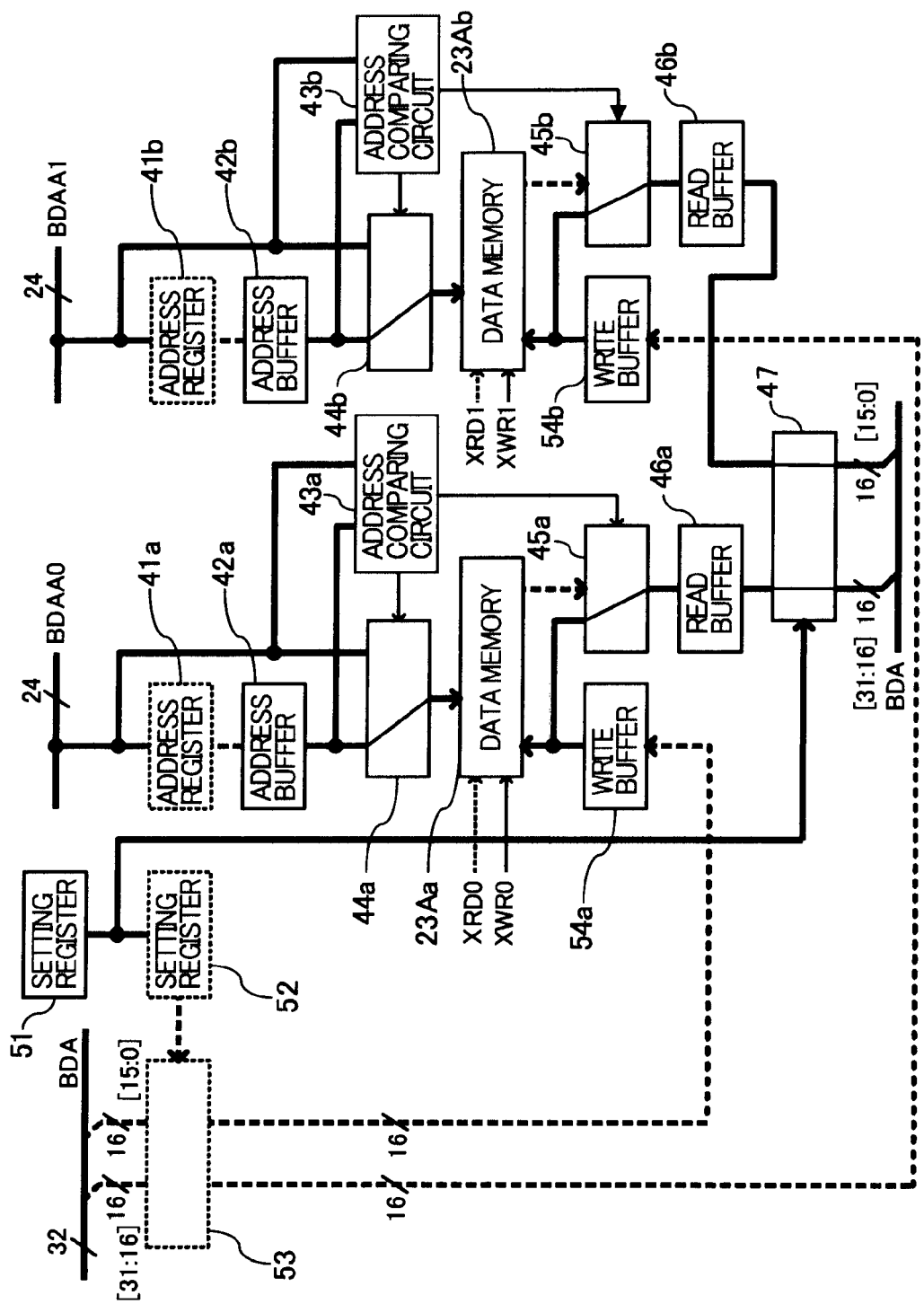
FIG. 18 is a diagram of a read operation following a write operation to the same address when the data size is 32 bits and the address is of an even number.
Figure 19:
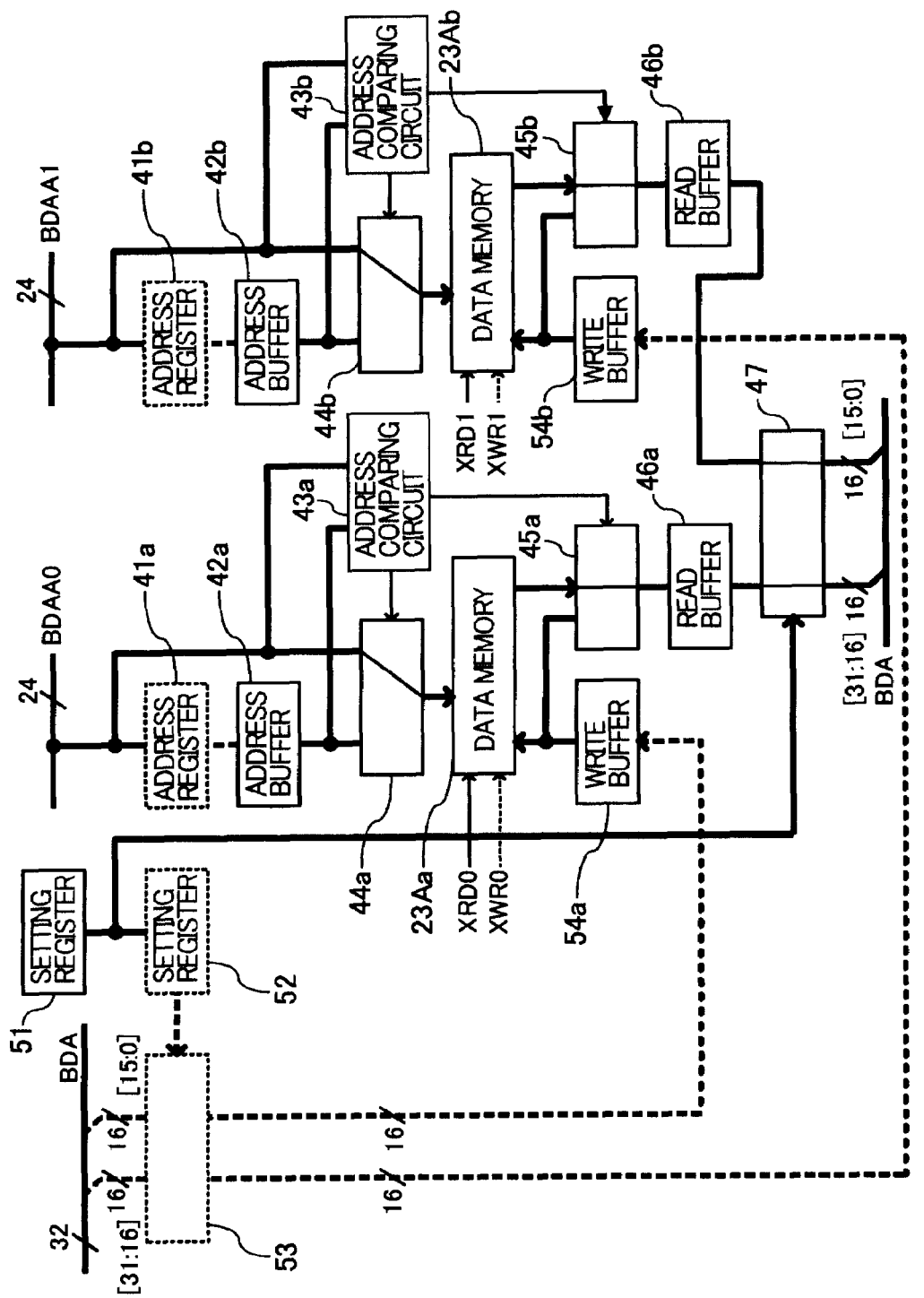
FIG. 19 is a diagram of a read operation to one address following a write operation to another address when the data size is 32 bits and the address is of an even number.
Figure 20:
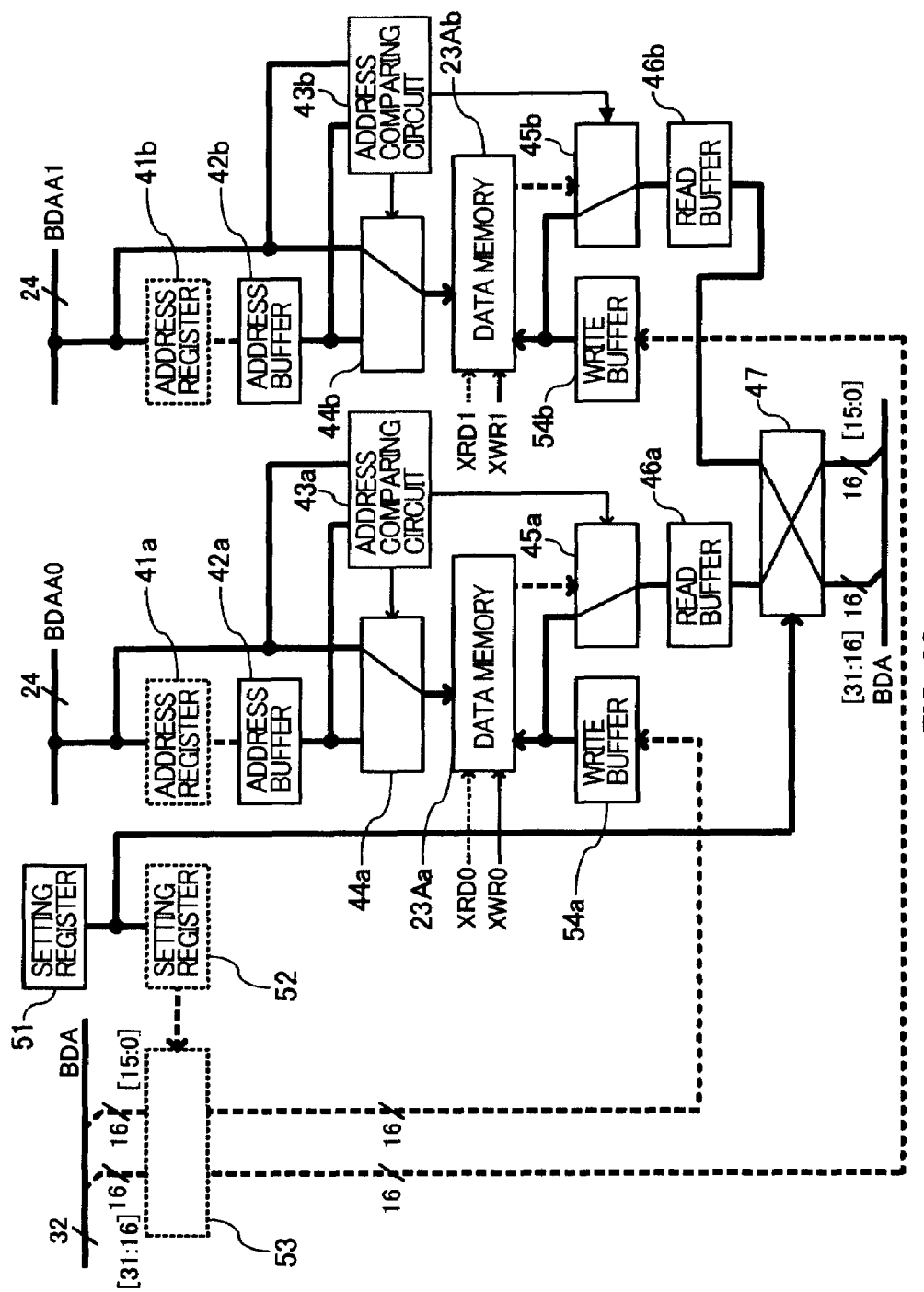
FIG. 20 is a diagram of a read operation following a write operation to the same address when the data size is 32 bits and the address is of an odd number.
Figure 21:
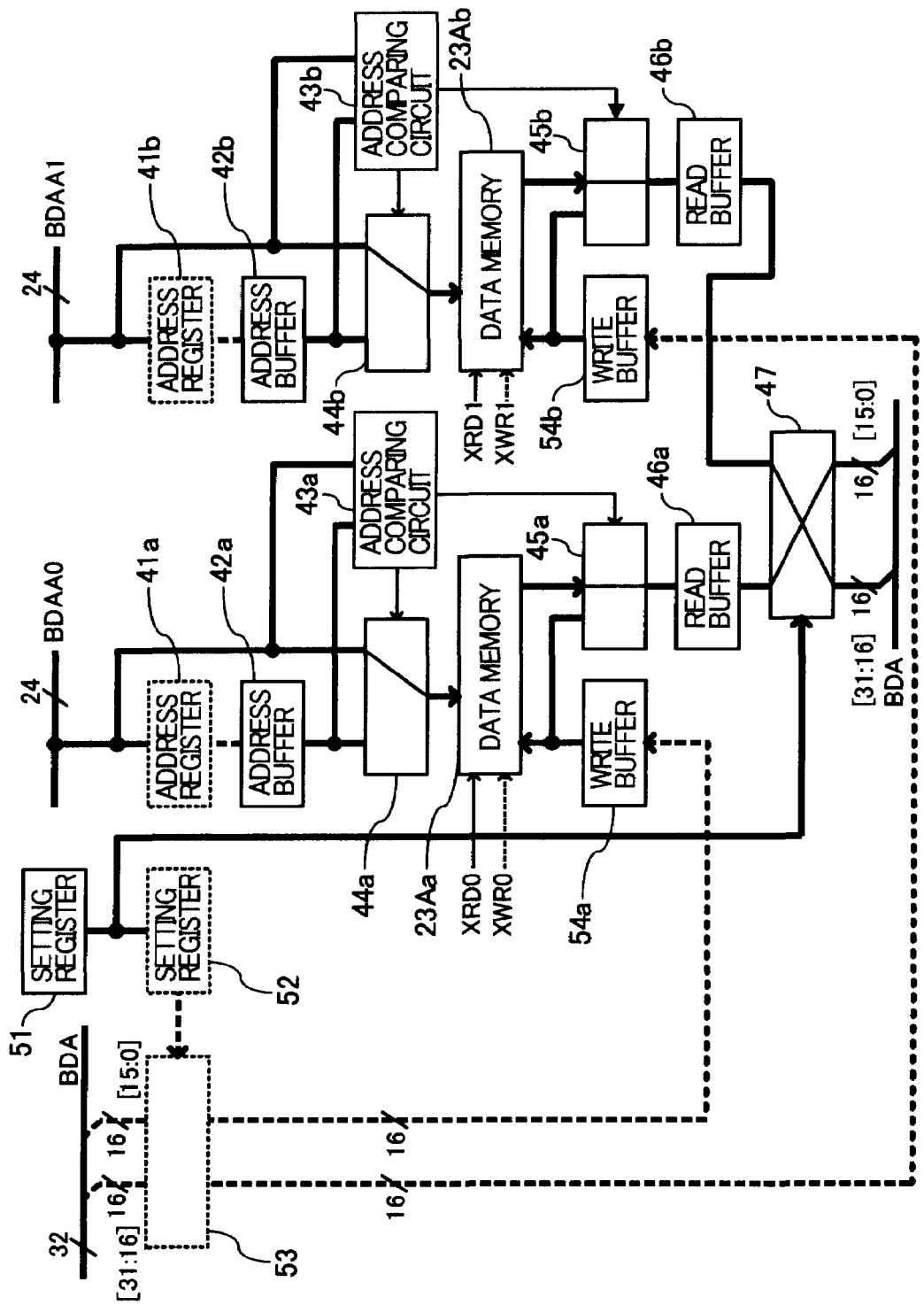
FIG. 21 is a diagram of a read operation to one address following a write operation to another address when the data size is 32 bits and the address is of an odd number.

FIG. 17 is a diagram of a read operation to one address following a write operation to another address when the data size is 16 bits and the address in the address space is of an odd number. The operation from stage A through stage E1 is the same as in the case of FIG. 16.

In the case of FIG. 17, with the read operation being preceded by the write operation, the address comparing circuit 43b, under control of the pipeline control circuit 32, outputs the result of comparison between the address being output to the address bus BDAA1 and the address stored in the address buffer 42b. Since these two addresses are different in the case of FIG. 17, the address selecting circuit 44b, in accordance with the result of comparison output from the address comparing circuit 43b, inputs the address being output to the address bus BDAA1 to the address input terminal of the data memory 23Ab. With the outputting of the request to read (XRD1="0") from the pipeline control circuit 32 to the data memory 23Ab, corresponding data is output from the data memory 23Ab. The read data selecting circuit 45b, in accordance with the result of comparison output from the address comparing circuit 43b, outputs the data output from the data memory 23Ab to the read buffer 46b. The read data compositing circuit 47, in accordance with the information stored in the setting register 51, outputs the data stored in the read buffer 46b to the low-order 16 bits [15:0] of the data bus BDA. The address stored in the address buffer 42b and the data stored in the write buffer 54b are retained without being cleared. With an appropriate timing after the read out of the data from the data memory 23Ab, the address stored in the address buffer 42b is input to the address input terminal of the data memory 23Ab and, with the outputting of the request to write (XWR1="0"), data is written to the data memory 23Ab.

FIGS. 18 to 21 are diagrams of operations when the data size in FIGS. 14 to 17 is changed to 32 bits. When the data size is 32 bits, the read data compositing circuit 47 outputs the data stored in the read buffers 46a and 46b to the data bus BDA [31:0] in accordance with the information stored in the setting register 51.

Figure 22:
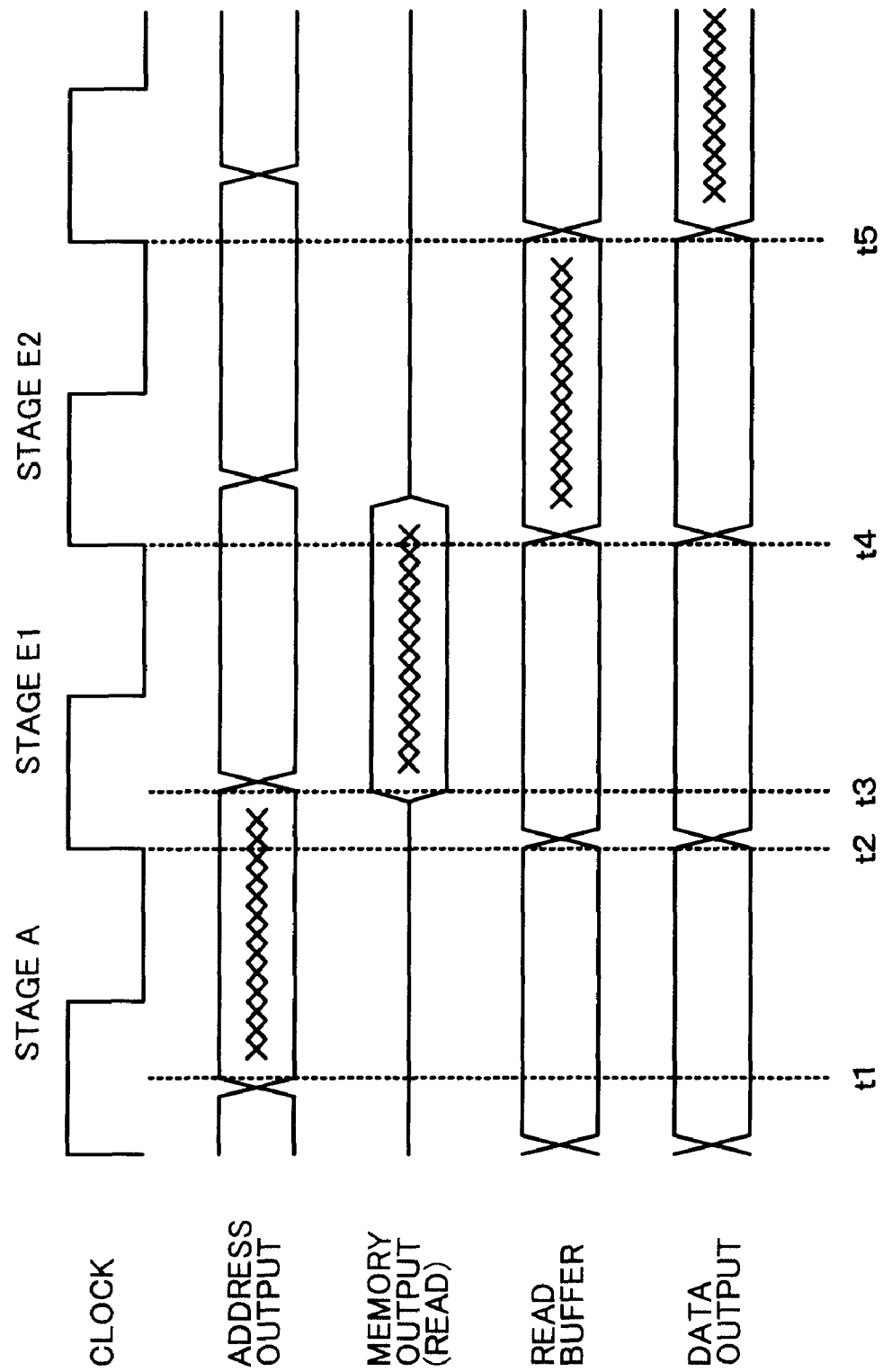
FIG. 22 is a chart of timing at the time of the read operation.

FIG. 22 is a chart of timing at the time of the read operation. Here, description will be made of an example of the read operation being performed as shown in FIG. 6.

Firstly, upon rising of the clock (first timing) at stage A, the address generating circuit 33 generates the address and at time t1, the address is output to the address bus BDAA0. Then, upon the next rising of the clock (second timing) at time t2, the request to read (XRD0="0") is output to the data memory 23Aa and at time t3, the data memory 23Aa starts to output corresponding data. Further, upon the next rising of the clock at time 4, the data output from the data memory 23Aa is taken into the read buffer 46a. Further, at the next rising of the clock at time 5, the data stored in the read buffer 46a is output to the low-order 16 bits [15:0] of the data bus BDA and is stored in the register 24. Then, the data stored in the register 24 is used for the arithmetic processing by the arithmetic circuit 25.

As seen above, in the DSP 10, at stage A that is a stage one clock cycle prior to stage E1, the read address is output to the address bus BDAA. Therefore, a sufficient time can be provided for setting up the read address, as compared, for example, with the case of outputting the read address to the address bus BDAA upon the rising of the clock at stage E1 and outputting the request to read the data to the data memories 23Aa and 23Ab upon falling of the clock at stage E1. Also, in the DSP 10, the data output from the data memories 23Aa and 23Ab is taken into the read buffer at stage E2. Therefore, a sufficient time can be provided for setting up the storage of the read data, as compared, for example, with the case of outputting the request to read the data to the data memories 23Aa and 23Ab upon falling of the clock at stage E1 and taking the data into the register 24 upon rising of the clock at stage E2. The sufficient time provided for setting up in the DSP 10 enables increasing the clock frequency and enhancing the processing speed of the DSP 10.

Figure 23:
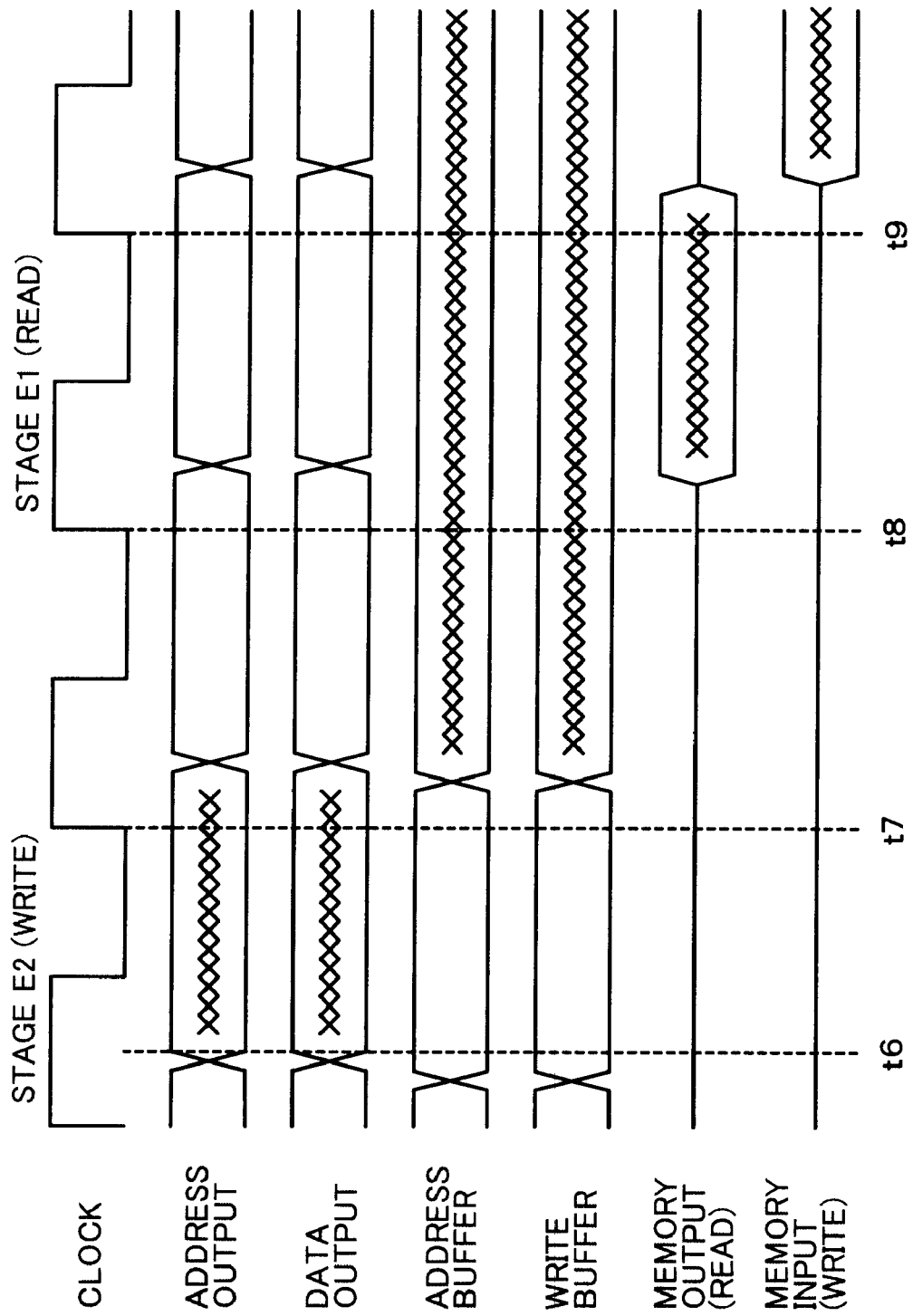
FIG. 23 is a chart of timing at the time of the write operation.

FIG. 23 is a chart of timing at the time of the write operation. Here, description will be made of an example of the write operation to one address followed by the read operation to another address as shown in FIG. 15. Firstly, at time t6 in stage E2 (first timing) of the write operation, the address is taken into the address register 41a and the write data is output to the low-order 16 bits [15:0] of the data bus BDA. Then, upon rising of the next clock (second timing) at time t7, the address stored in the address register 41a is taken into the address buffer 42a and the data output to the low-order 16 bits [15:0] of the data bus BDA is taken into the write buffer 54a. In the example shown in FIG. 15, since the write address and the read address are different, upon rising of the next clock (timing of the start of stage E1 of the read operation) at time t8, the request to read (XRD0="0") is output to the data memory 23Aa and corresponding data is output from the data memory 23Aa. The address stored in the address buffer 42a and the data stored in the write buffer 54a are retained without being cleared. Then, upon rising of the next clock at time t9, with the address stored in the address buffer 42a being input to the address input terminal of the data memory 23Aa and with the request to write (XWR0="0") being output to the data memory 23Aa, the data is written to the data memory 23Aa. When a plurality of read operations to different addresses continue, the address stored in the address buffer 42a and the data stored in the write buffer 54a are retained during the period until completion of such read operations and the data is written to the data memory 23Aa after the completion of the read operations.

As seen above, in the DSP 10, at the clock cycle following stage E2, the address is taken into the address buffer 42a/42b and the write data is taken into the write buffer 54a/54b. Then, upon rising of the clock at the subsequent clock cycle, the request to write is output to the data memory 23Aa/23Ab. Therefore, a sufficient time can be provided for setting up the write address and the write data, as compared, for example, with the case of starting to output the write address and the write data to the data memory 23Aa/23Ab upon rising of the clock at stage E2 and outputting the request to write to the data memory 23Aa/23Ab upon falling of the clock at stage E2. The sufficient time provided for setting up in the DSP 10 enables increasing the clock frequency and enhancing the processing speed of the DSP 10.

In the DSP 10, in the case of the write operation to one address being followed by the read operation to another address, a priority is given to the read access to the data memory 23Aa. In the DSP 10, in the case of the write operation being followed by the read operation to the same address, the data stored in the write buffer 54a/54b is output as the read data and at the same time, the data stored in the write buffer 54a/54b is written to the data memory 23Aa/23Ab. Namely, in the DSP 10, the following read operation is not forced to wait by the preceding write operation, the time for waiting for the data is shortened, and the processing speed can be enhanced.

The above has described the embodiments of the present invention. As described above, the DSP 10 can generate and output the read data from the data output from at least one of the two data memories 23Aa and 23Ab, based on the information on the data size of the read data and the information on the address in the address space of the read data. Namely, the DSP 10 can not only read out the data from either one of the data memories 23Aa and 23Ab but also read out the data from both of the data memories 23Aa and 23Ab. When the data is read out from both of the data memories 23Aa and 23Ab, two pieces of the read out data can be used as two pieces of input data to one multiply accumulator making up the arithmetic circuit 25. Likewise, further two pieces of data can be read out from the memory access circuit 21B as well, and therefore, the DSP 10 as a whole can simultaneously read out four pieces of data. Therefore, the arithmetic operation can simultaneously be performed at two multiply accumulators making up the arithmetic circuit 25. As seen above, efficient memory access is realized in the DSP 10 and the speed up of the arithmetic processing is achieved in the DSP 10.

The memory access circuit 21A of the DSP 10 stores the data of an even-number address in the address space in the data memory 23Aa and the data of an odd-number address in the data memory 23Ab. The read data compositing circuit 47 generates the read data depending on whether the address of the read data is of an even number or of an odd number and whether the data size of the read data is 16 bits (N bits) or 32 bits (2N bits). Namely, the DSP 10, by way of the memory access circuit 21A, can read out one piece of 16-bit data and can also read out two pieces of 16-bit data simultaneously. Likewise, the DSP 10, by way of the memory access circuit 21B, can read out one piece of 16-bit data and can also read out two pieces of 16-bit data simultaneously. Namely, the DSP 10 can read out a maximum of 4 pieces of 16-bit data simultaneously. As seen above, the DSP 10, by realizing the efficient memory access, can enhance the processing speed.

Based on the information on the data size of the write data and the information on the address in the address space of the write data, the DSP 10 can write the data to at least one of the data memories 23Aa and 23Ab. Namely, the DSP 10 can write the data to either one of the data memories 23Aa and 23Ab and can also write the data to both of the data memories 23Aa and 23Ab. Furthermore, by way of the memory access circuit 21B as well, the DSP 10 can write the data in the same manner and therefore, the DSP 10 as a whole can write four pieces of data simultaneously. As seen above, the DSP 10, by realizing the efficient memory access, can enhance the processing speed.

In the memory access circuit 21A of the DSP10, the data of an even-number address in the address space is stored in the data memory 23Aa and the data of an odd-number address is stored in the data memory 23Ab. Depending on whether the address of the write data is of an even number or an odd number and whether the data size of the write data is 16 bits (N bits) or 32 bits (2N bits), the write data selecting circuit 53 outputs the data output to the data bus BDA to the write buffer 54a/54b. Namely, the DSP 10, by way of the memory access circuit 21A, can write one piece of 16-bit data and can also write two pieces of 16-bit data simultaneously. Likewise, the DSP 10, by way of the memory access circuit 21B, can write one piece of 16-bit data and can also write two pieces of 16-bit data simultaneously. Therefore, the DSP 10 can simultaneously write a maximum of 4 pieces of 16-bit data. As seen above, the DSP 10, by realizing the efficient memory access, can enhance the processing speed.

In the memory access circuit 21A, when the write operation is followed by the read operation, it is so controlled that the read operation is not forced to wait by the write operation. Namely, when the write operation is followed by the read operation, in the case of the write address and the read address being different, the data is read out from the data memory 23Aa/23Ab before the data is written to the data memory 23Aa/23Ab. In the case of the write address and the read address being the same, the data stored in the write buffer 54a/54b is used for generating the read data and at the same time, is written to the data memory 23Aa/23Ab. As a result, when the write operation is followed by the read operation, the following read operation is not forced to wait by the preceding write operation and the data waiting time in the arithmetic circuit 25 is shortened. Namely, the DSP 10, by realizing the efficient memory access, can enhance the processing speed.

In the memory access circuit 21A of the DSP 10, a sufficient time is provided for setting up the read address in the read operation. For this reason, the clock frequency can be increased and the processing speed of the DSP 10 can be enhanced.

In the memory access circuit 21A of the DSP 10, a sufficient time is provided for setting up the write address and the write data in the write operation. For this reason, the clock frequency can be increased and the processing speed of the DSP 10 can be enhanced.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A memory access apparatus for accessing a first memory and a second memory, comprising:
   an address outputting unit configured to output a read address to at least one of the first and the second memories based on a data size and an address in an address space of a read data;
   an access request outputting unit configured to output a read request to at least one of the first and the second memories based on the data size and the address in the address space of the read data;
   a data information outputting unit configured to output an information on the data size, and an information on the address, of the read data; and
   a read data outputting unit configured to generate the read data to be output, from the data output from at least one of the first and the second memories in response to the read address output from the address outputting unit and the read request output from the access request outputting unit, based on the information on the data size and the information on the address that are output from the data information outputting unit.

2. The memory access apparatus of claim 1, wherein the first memory is configured to store data of an N-bit width and of an even-number address in the address space and the second memory is configured to store data of an N-bit width and of an odd-number address in the address space, wherein
   the address outputting unit is configured to output the read address corresponding to the address in the address space
      to the first or the second memory when the data size of the read data is N bits and
      to the first and the second memories when the data size of the read data is 2N bits, and wherein
   the read data outputting unit is configured
      to output the data output from the first or the second memory as the read data when the data size of the read data is N bits,
      to generate the read data to be output, with the data output from the first memory being assigned as high-order bits of the read data and the data output from the second memory being assigned as low-order bits of the read data, when the data size of the read data is 2N bits and the address in the address space of the read data is an even-number address, and
      to generate the read data to be output, with the data output from the second memory being assigned as high-order bits of the read data and the data output from the first memory being assigned as low-order bits of the read data, when the data size of the read data is 2N bits and the address in the address space of the read data is an odd-number address.

3. The memory access apparatus of claim 1, wherein
   the address outputting unit is configured to output a write address to at least one of the first and the second memories, based on a data size and an address in an address space of a write data, wherein
   the access request outputting unit is configured to output a write request to at least one of the first and the second memories, based on the data size and the address in the address space of the write data, and wherein
   the data information outputting unit is configured to output an information on the data size, and an information on the address, of the write data,
   the memory access apparatus further comprising a write data outputting unit configured to output the write data to at least one of the first and the second memories, based on the information on the data size and the information on the address that are output from the data information outputting unit.

4. The memory access apparatus of claim 3, wherein the first memory is configured to store data of an N-bit width and of an even-number address in the address space and the second memory is configured to store data of an N-bit width and of an odd-number address in the address space, wherein
   the address outputting unit is configured to output the write address corresponding to the address in the address space
      to the first or the second memory when the data size of the write data is N bits and
      to the first and the second memories when the data size of the write data is 2N bits, and wherein
   the write data outputting unit is configured
      to output the write data to the first memory when the data size of the write data is N bits and the address in the address space of the write data is an even-number address, to output the write data to the second memory when the data size of the write data is N bits and the address in the address space of the write data is an odd-number address, to output high-order N bits of the write data to the first memory and low-order N bits of the write data to the second memory when the data size of the write data is 2N bits and the address in the address space of the write data is an even-number address, and to output high-order N bits of the write data to the second memory and low-order N bits of the write data to the first memory when the data size of the write data is 2N bits and the address in the address space of the write data is an odd-number address.

5. The memory access apparatus of claim 3, further comprising:

a write address memorizing unit configured to memorize the write address output from the address outputting unit;

a write data memorizing unit configured to memorize the write data output from the write data outputting unit before the write data is written to the first or the second memory; and an address selecting circuit configured to output the read address to the first or the second memory, when the read address output from the address outputting unit and the write address memorized in the write address memorizing unit are different, wherein the read data outputting unit is configured to generate the read data to be output, from the data output from at least one of the first and the second memories when the read address output from the address outputting unit and the write address memorized in the write address memorizing unit are different and to output the write data memorized in the write data memorizing unit when the read address output from the address outputting unit and the write address memorized in the write address memorizing unit are the same.

6. The memory access apparatus of claim 4, further comprising:

a write address memorizing unit configured to memorize the write address output from the address outputting unit;

a write data memorizing unit configured to memorize the write data output from the write data outputting unit before the write data is written to the first or the second memory; and an address selecting circuit configured to output the read address to the first or the second memory, when the read address output from the address outputting unit and the write address memorized in the write address memorizing unit are different, wherein the read data outputting unit is configured to generate the read data to be output, from the data output from at least one of the first and the second memories when the read address output from the address outputting unit and the write address memorized in the write address memorizing unit are different and to output the write data memorized in the write data memorizing unit when the read address output from the address outputting unit and the write address memorized in the write address memorizing unit are the same.

7. The memory access apparatus of claim 1, wherein the address outputting unit is configured to output the read address at a first timing when a clock changes from one logic level to the other logic level, and wherein the access request outputting unit is configured to output the read request at a second timing when the clock changes from the one logic level to the other logic level, next to the first timing.

8. The memory access apparatus of claim 5, wherein the address outputting unit is configured to output the write address at a first timing when a clock changes from one logic level to the other logic level, and wherein the access request outputting unit is configured to have the write address memorizing unit memorize the write address output from the address outputting unit, and at the same time, to have the write data memorizing unit memorize the write data output from the write data outputting unit, at a second timing when the clock changes from the one logic level to the other logic level, next to the first timing.

* * * * *

UNITED STATES PATENT AND TRADEMARK OFFICE
CERTIFICATE OF CORRECTION

PATENT NO.        : 7,702,860 B2                                                                Page 1 of 1
APPLICATION NO.   : 11/832536
DATED             : April 20, 2010
INVENTOR(S)       : Iwao Honda It is certified that error appears in the above-identified patent and that said Letters Patent is hereby corrected as shown below:

On the title page, item (30), column 1, line 1, below "Prior Publication Data"
insert -- (Foreign Application Priority Data), Sep. 21, 2006 (JP).................2006-256162 --.

Signed and Sealed this

Sixth Day of July, 2010

David J. Kappos
*Director of the United States Patent and Trademark Office*